US010559009B1

(12) United States Patent
Kingman, Jr. et al.

(10) Patent No.: US 10,559,009 B1
(45) Date of Patent: Feb. 11, 2020

(54) SYSTEM AND METHOD FOR LINKING QUALIFIED AUDIENCES WITH RELEVANT MEDIA ADVERTISING THROUGH IP MEDIA ZONES

(71) Applicant: Semcasting, Inc., North Andover, MA (US)

(72) Inventors: Raymond R. Kingman, Jr., Newburyport, MA (US); Brian K. Rivard, Newbury, MA (US); Daniel V. Ostertag, Tewksbury, MA (US)

(73) Assignee: Semcasting, Inc., North Andover, MA (US)

( * ) Notice: Subject to any disclaimer, the term of this patent is extended or adjusted under 35 U.S.C. 154(b) by 847 days.

(21) Appl. No.: 14/217,301

(22) Filed: Mar. 17, 2014

Related U.S. Application Data

(60) Provisional application No. 61/798,281, filed on Mar. 15, 2013.

(51) Int. Cl.
 *G06Q 30/00* (2012.01)
 *G06Q 30/02* (2012.01)
(52) U.S. Cl.
 CPC ..... *G06Q 30/0269* (2013.01); *G06Q 30/0242* (2013.01); *G06Q 30/0254* (2013.01); *G06Q 30/0277* (2013.01)
(58) Field of Classification Search
 CPC ............... G06Q 30/0269; G06Q 30/0254
 (Continued)

(56) References Cited

U.S. PATENT DOCUMENTS

| | | | | | |
|---|---|---|---|---|---|
| 5,251,205 | A | * | 10/1993 | Callon | H04L 29/06 370/392 |
| 8,275,659 | B2 | * | 9/2012 | Ellis | G06Q 30/02 705/14.41 |

(Continued)

OTHER PUBLICATIONS

Kingman, et al., "U.S. Appl. No. 13/472,582, System and Method for Creating Customized IP Zones Utilizing Predictive Modeling", May 16, 2012, Published in: US.

*Primary Examiner* — Luis A Brown
(74) *Attorney, Agent, or Firm* — Loginov & Associates, PLLC; William A. Loginov

(57) ABSTRACT

The system links Internet web page context with audience usage and location data to support advertising efficiency and effectiveness. An ontology of categories is created where domains and website pages are classified and scored against the links on those pages and the meta-tag key word pools that are harvested from those web pages. An ontology of high level categories are derived from the frequency of the key words appearing within the domain URL addresses of the pages, the domain of the links on those pages or within the content of the pages themselves. A method includes building a training set of web pages from a plurality of ad networks and sites where the system captures impressions in the form of real-time bids as well as click through events that include the IP address, the domain, the time of day and day of week, ad size and position, browser type, and bid amount whereby the training set is aggregated in a database whereby successful bids can be used in combination with audience and category attributes to model and score impression bids that combine the optimal mix of audience attributes, location, categorical affinity and bid price.

3 Claims, 17 Drawing Sheets

(58) Field of Classification Search
USPC .......... 705/14.41, 14.43, 14.52, 14.66, 14.73
See application file for complete search history.

(56) References Cited

U.S. PATENT DOCUMENTS

| | | | | |
|---|---|---|---|---|
| 8,296,180 B1* | 10/2012 | Epperson | ........... | G06Q 30/0251 705/14.1 |
| 8,788,326 B1* | 7/2014 | Epperson | ........... | G06Q 30/0251 705/14.1 |
| 8,799,062 B1* | 8/2014 | Epperson | ........... | G06Q 30/0269 705/14.1 |
| 8,825,662 B1* | 9/2014 | Kingman | ........... | G06Q 30/0251 707/741 |
| 8,862,735 B1* | 10/2014 | Singh | ........... | H04L 61/2076 709/226 |
| 9,641,547 B2* | 5/2017 | Yampolskiy | ........ | H04L 63/1433 |
| 9,715,699 B1* | 7/2017 | Els | ........... | G06Q 30/0275 |
| 10,019,736 B2* | 7/2018 | Sankaran | ........... | G06Q 30/0269 |
| 10,204,359 B1* | 2/2019 | Lee | ........... | G06Q 30/0255 |
| 10,282,758 B1* | 5/2019 | Els | ........... | G06Q 30/0275 |
| 10,290,025 B1* | 5/2019 | Howes | ........... | G06Q 30/0275 |
| 10,326,786 B2* | 6/2019 | Gladstone | ........... | H04L 63/1433 |
| 2003/0033155 A1* | 2/2003 | Peerson | ........... | G06Q 30/02 705/1.1 |
| 2009/0089151 A1* | 4/2009 | Protheroe | ........... | G06Q 10/00 705/14.69 |
| 2010/0048165 A1* | 2/2010 | Caldwell | ........... | H04M 15/41 455/406 |
| 2010/0114650 A1* | 5/2010 | Sherr | ........... | G06Q 10/04 705/7.31 |
| 2010/0121684 A1* | 5/2010 | Morio | ........... | G06Q 30/02 705/7.13 |
| 2010/0180013 A1* | 7/2010 | Shkedi | ........... | H04L 67/10 709/219 |
| 2011/0184793 A1* | 7/2011 | Bohannon | ........... | G06Q 10/107 705/14.14 |
| 2011/0246326 A1* | 10/2011 | Thomas | ........... | G06Q 30/02 705/26.63 |
| 2011/0282738 A1* | 11/2011 | Thomas | ........... | G06Q 30/02 705/14.49 |
| 2012/0225992 A1* | 9/2012 | Shalati | ........... | C08G 18/4669 524/507 |
| 2012/0259972 A1* | 10/2012 | Bafna | ........... | H04L 41/0853 709/224 |
| 2014/0047225 A1* | 2/2014 | Faden | ........... | G06F 9/45533 713/1 |
| 2014/0244718 A1* | 8/2014 | Das | ........... | G06F 11/1425 709/203 |

\* cited by examiner

Bidder – Variable Based Scores with Weighting

| | | Weighting | Attribute Score |
|---|---|---|---|
| IP Zone Audience | 75 | 60% | 45% |
| User Typing | 100 | 5% | 5 |
| Category Classifier | 80 | 30% | 24 |
| TOD, DOW, Device | 100 | 5% | 5 |
| Bid Price Range | | | |

Table 3 - Top Categories with Metadata Scores Example

| CATEGORY_NAME | MORNING_PCT | AFTERNOON_PCT | EVENING_PCT | WEEKDAY_PCT | WEEKEND_PCT | MIN_WIN_PRICE | AVG_WIN_PRICE | MAX_WIN_PRICE | PIX_300_250_PCT |
|---|---|---|---|---|---|---|---|---|---|
| Arts & Entertainment/Humor/Live Comedy | 0.22 | 0.23 | 0.41 | 0.56 | 0.44 | 0.0105 | 1.6487 | 26.191 | 0.431 |
| Finance/Credit & Lending | 0.25 | 0.24 | 0.42 | 0.49 | 0.51 | 0.0105 | 2.0049 | 15.795 | 0.451 |
| Travel/Travel Agencies & Services/Vacation | 0.24 | 0.23 | 0.43 | 0.52 | 0.48 | 0.011 | 2.2318 | 12.364 | 0.24 |
| News/Journalism & News Industry | 0.25 | 0.26 | 0.38 | 0.57 | 0.43 | 0.0105 | 2.1972 | 22 | 0.452 |
| Business & Industrial/Chemicals Industry/Ag | 0.3 | 0.31 | 0.33 | 0.53 | 0.47 | 0.021 | 2.3803 | 12.144 | 0.447 |
| Sports/Combat Sports | 0.23 | 0.25 | 0.4 | 0.53 | 0.47 | 0.0105 | 1.7967 | 26.103 | 0.373 |
| Business & Industrial/Retail Trade | 0.21 | 0.23 | 0.43 | 0.5 | 0.5 | 0.0105 | 1.328 | 18.135 | 0.718 |
| Business & Industrial/Energy & Utilities/Ren | 0.25 | 0.23 | 0.38 | 0.52 | 0.48 | 0.011 | 1.9013 | 12.793 | 0.403 |
| Science/Physics | 0.21 | 0.25 | 0.45 | 0.56 | 0.44 | 0.0105 | 2.1333 | 18.106 | 0.394 |
| Autos & Vehicles/Vehicle Brands/Jaguar | 0.2 | 0.24 | 0.47 | 0.56 | 0.44 | 0.0105 | 2.318 | 15.543 | 0.35 |
| Internet & Telecom/Mobile & Wireless/Mot | 0.2 | 0.23 | 0.44 | 0.54 | 0.46 | 0.0105 | 2.051 | 24.167 | 0.479 |
| Games/Board Games | 0.22 | 0.22 | 0.46 | 0.54 | 0.46 | 0.0105 | 2.2192 | 23.947 | 0.279 |
| Law & Government/Government/Legislative | 0.29 | 0.29 | 0.34 | 0.75 | 0.25 | 0.0105 | 1.9159 | 19.624 | 0.4 |
| Health/Health Conditions/Allergies | 0.24 | 0.21 | 0.41 | 0.56 | 0.44 | 0.011 | 2.4148 | 12.232 | 0.49 |
| Food & Drink/Candy & Sweets | 0.21 | 0.26 | 0.44 | 0.53 | 0.47 | 0.0105 | 2.1534 | 16.852 | 0.4 |
| Health/Medical Facilities & Services/Hospita | 0.32 | 0.27 | 0.34 | 0.65 | 0.35 | 0.0105 | 2.6245 | 16.027 | 0.418 |
| World Localities/Oceania/Australia | 0.27 | 0.28 | 0.33 | 0.59 | 0.41 | 0.0105 | 1.7208 | 13.068 | 0.376 |
| Science/Mathematics/Statistics | 0.21 | 0.26 | 0.42 | 0.52 | 0.48 | 0.0105 | 2.1709 | 15.07 | 0.208 |
| Shopping | 0.24 | 0.24 | 0.4 | 0.55 | 0.45 | 0.0056 | 2.2999 | 27.555 | 0.378 |
| Real Estate/Apartments & Residential Renta | 0.21 | 0.26 | 0.45 | 0.52 | 0.48 | 0.0105 | 2.703 | 16.115 | 0.336 |
| Online Communities/Blogging Resources & : | 0.21 | 0.25 | 0.42 | 0.52 | 0.48 | 0.0099 | 1.9559 | 17.611 | 0.454 |
| Beauty & Fitness/Hair Care | 0.21 | 0.26 | 0.44 | 0.54 | 0.46 | 0.0105 | 2.413 | 23.617 | 0.38 |
| Computers & Electronics/Enterprise Techno | 0.21 | 0.24 | 0.43 | 0.5 | 0.5 | 0.0105 | 1.3321 | 18.135 | 0.717 |
| Business & Industrial/Printing & Publishing/ | 0.3 | 0.29 | 0.33 | 0.66 | 0.34 | 0.022 | 2.6196 | 10.648 | 0.467 |
| Business & Industrial/Transportation & Logis | 0.26 | 0.27 | 0.39 | 0.75 | 0.25 | 0.011 | 2.4101 | 10.285 | 0.573 |
| Health/Health Conditions/Cold & Flu | 0.24 | 0.23 | 0.41 | 0.55 | 0.45 | 0.0105 | 2.4102 | 13.189 | 0.429 |
| Beauty & Fitness/Fitness | 0.27 | 0.26 | 0.35 | 0.53 | 0.47 | 0.0105 | 2.9306 | 25.971 | 0.299 |
| Internet & Telecom/Service Providers/Cable | 0.3 | 0.22 | 0.35 | 0.58 | 0.42 | 0.0105 | 2.3364 | 14.168 | 0.775 |
| People & Society/Family & Relationships | 0.23 | 0.23 | 0.41 | 0.52 | 0.48 | 0.0105 | 2.3465 | 22.385 | 0.355 |
| Games/Computer & Video Games/Game Ch | 0.21 | 0.25 | 0.42 | 0.5 | 0.5 | 0.0105 | 1.782 | 23.122 | 0.331 |
| Law & Government/Government/Royalty | 0.29 | 0.25 | 0.38 | 0.6 | 0.4 | 0.0105 | 1.8682 | 19.778 | 0.372 |
| Games/Online Games | 0.22 | 0.27 | 0.38 | 0.51 | 0.49 | 0.0014 | 1.5636 | 26.103 | 0.301 |
| Arts & Entertainment/Performing Arts/Danc | 0.19 | 0.25 | 0.47 | 0.5 | 0.5 | 0.0105 | 2.9928 | 22.011 | 0.513 |
| Computers & Electronics/Software/Educatio | 0.4 | 0.31 | 0.25 | 0.73 | 0.27 | 0.0105 | 1.9556 | 14.069 | 0.204 |
| Law & Government/Government | 0.31 | 0.25 | 0.35 | 0.63 | 0.37 | 0.0105 | 2.0105 | 22.616 | 0.371 |

Fig. 17

SYSTEM AND METHOD FOR LINKING QUALIFIED AUDIENCES WITH RELEVANT MEDIA ADVERTISING THROUGH IP MEDIA ZONES

RELATED APPLICATIONS

This application claims the benefit of U.S. Provisional Application Ser. No. 61/798,281, filed Mar. 15, 2013, entitled SYSTEM AND METHOD FOR LINKING QUALIFIED AUDIENCES WITH RELEVANT MEDIA ADVERTISING THROUGH IP MEDIA ZONES, the entire disclosure of which is herein incorporated by reference.

FIELD OF THE INVENTION

This invention is related to marketing systems, and more particularly to marketing systems that target advertising via the internet and methods therefore.

BACKGROUND OF THE INVENTION

One of the more effective ways to connect the right prospects for purchase of goods and services online in online advertising is to advertise on sites that attracted a viewership most closely aligned with a target audience. This approach was manually implemented for some time in the early days of online advertising for all types of online advertising, including search, display and video.

Due to the ubiquitous nature of search engines in the online infrastructure the application of contextual advertising is still one of the most popular technique used in online advertising. Placing a contextually relevant advertising in front of a person who enters a search term is still considered the most commercially dominant segment of online advertising. A substantial industry ecosystem has been built around search advertising and the contextualization of media, or web pages. For select websites there is also location and demographic or behavioral attribution associated with the individual visiting a site. However, there currently is no systemic and quantifiable linkage between the search term entry and the person making that entry.

The search segment of the online advertising market is contextually based. The display, video and mobile segments of the ad industry is focused around applications of audience targeting methodologies that increase the relevancy and effective reach to specific users for most online campaigns. Leveraging Data Exchanges, Data Management Platforms and Ad Networks unique users are identified through a behavioral targeting process using browser cookies. Cookies are effectively aggregate into large pools of end users who can be characterized anonymously within ad segments by inferring demographic and behavioral attributes based on the pattern of site visits attributed to each cookie. The inventory of cookie segments are often brokered and resold to third parties to increase scale for the promotion of products and services. With the audience targeting infrastructure of ad networks and exchanges becoming increasingly centralized around data and the pooling of cookies, audiences can be targeted across most publisher web sites completely independent of content on the web pages. There is currently no systemic and quantifiable linkage made between the attributes assigned to a cookie and the media on which the advertising appears.

Centralization of the site and page inventory has helped to bring scale to the industry but did essentially nothing to qualify an audience's interests, or make the cookie based targeting process more transparent to advertisers for display, video, or mobile.

With cookie based audience targeting solutions there is limited relevancy of information between the cookie and the audience, and no quantifiable linkage between the cookie and the context of the page an ad appears on. While much of the display, video and mobile industry remains cookie-based at this time, audience targeting techniques continue to evolve including techniques such as IP Zone Targeting which operates like traditional offline direct marketing in direct mail, television and even email advertising. Techniques like IP Zones connect the IP Address Range of clusters of users to a robust demographic, psychographic and geographic profile of those users. So while IP Zone Targeting serves to successfully link the attributes of an audience to the advertisers product or service, with IP Zone target alone, there currently is no linkage between the IP Zone Audience and the context of the page that ad will appear on.

With the majority of individuals online and the needs of the business community reliant on the Internet, the efficiency of online advertising is increasingly becoming a priority. The objective of online advertising is to identify the appropriate audience for a product or service and place the right message in front of them in a manner that generates the most return on investment.

The challenge the industry faces is finding a systemically effective way to connect the location and the demographic and psychographic profile of each individual online user to the product or service offering in the ad—as well as to the contextual relevance of the site on which the ad appears. A system that combines proven audience targeting based on location and demographic relevance with equally proven contextual target techniques will statistically outperform the online ad performance of either technique individually.

Online Ad Agencies and Media Planners have access to Ad Network trading desks where ads are served and tracked. Ads are tracked in part by the category of sites, and/or the domains, the URL, the time of day, and day of week, on which the ads appear. They track categories where users click on the ad and when it appears on the sites. Agencies and Media Planners manually adjust the weight or frequency of investment in inventory through analysis of A/B testing or other post-process algorithmic means to optimize which select ads appear in a category or site. In essence, Agencies and Media Planners are providing a manual form of contextual relevance to the ad optimization process for display, video and mobile ads that are currently being systemically targeted only by cookie based audiences.

The introduction of technologies like IP Zones Targeting addresses the requirement for a robust linkage between individual users, or audiences, and the location and relevance of the product or service being promoted.

Existing key word search optimization schemes effective address the requirement for a robust linkage between the key word request made by a user and the relevance of web site content on which an online advertisement appears.

Existing methods where Advertising Operations personnel manually optimize contextual relevance of the advertising at the Trading Desk to the audience based on AB testing or other algorithmic results during the course of the campaign.

Thus, it is desirable to combine the IP Zones Targeting audience identification process with an automated system and methods that optimize the linkage of location and a demographically qualified audience to the context and timing of advertising delivery where a qualified audience is brought to a contextual relevant page and to which the ad appears, for all types of online advertising including search, display, video and mobile advertising.

SUMMARY OF THE INVENTION

This invention overcomes disadvantages of the prior art by providing a plurality of systems, methods and non-transitory computer-readable medium that combines custom audience identification in the form of IP Zones that have been derived from off-line information with predictive modeling and segmentation by ISP, user type, demographics, timing, propensities and business attributes with media identification and classification, by linking IP Zones audience identification with a system for media identification where online contextual relevance is derived from a plurality of systems that combine a categorical ontology of site URL's and domain addresses with a real-time bidding platforms that provide attributes in impression requests including the URL of the ad, the IP Address of the requestor, the media position and size, browser type, and time of day whereby the ad impression request is automatically classified and scored as to its relevance to its web page contextual category type and then to its statistical relevance to the IP Zone audience.

In accordance with an illustrative embodiment, IP Zones encompasses the active population of households, businesses, schools, government facilities and wireless locations within its geography with an Internet connection. Each IP Zone representing an online audience defined as an aggregation of individuals or households based on the scope of the IP Zone that serves it. An IP Zone is not geographic by postal standards, but rather virtual, based on subdivisions within a zip code, each based on identified delivery points of service from the ISP and a plurality of demographic and psychographic variables that uniquely defines each IP Zone.

In accordance with an illustrative embodiment, an IP Zones definition system provided herein involves no tracking or placement of cookies. This means that every online users that meets an audience IP Zone definition are available as inventory. Thus, the potential to reach larger, better qualified audiences based on location, demographics, consumer interest and purchase data improves, and does so in a more efficient, privacy friendly manner.

In accordance with an illustrative embodiment, an audience IP zone is represented as a set of IP Addresses that are linked to three or more attributes representative of a desired audience, a geographic location, a user type represented as one or more homes, businesses, schools, government institutions, medical facilities, financial or other entity, and the demographic or Firmagraphic descriptive variables that describe the audience. Each zone is defined by multiple demographic, socio-economic, business or product attributes or variables. Each variable is represented as a score for its concentration, value, or affinity to the user type audience it represents. IP zone audiences can be selected by their attributes or compared against one another, modeled, and prioritized by their scores and used to determine the composition of a preferred audience for advertising.

In accordance with an illustrative embodiment, the system links Internet web pages supporting advertising to a ontology of categories where the site pages and domains are classified against those categories. An ontology of high level categories are derived from a plurality of known classification techniques including the frequency of the key words appearing within the domain URL addresses of the pages, the domain URL's of the links of those pages, or the meta-data tags within the content of the pages themselves. The system links Internet web pages that support advertising to an ontology of hierarchical domain categories classified and managed by a database comprised of a plurality of site URLs with the plurality of domain categories.

In accordance with an illustrative embodiment, a method using the real-time Impressions data and the real-time Click Through and Conversions data from a plurality of ad networks and sites where the system captures the IP Address, the site URL, time of day and day of week, browser type, creative ad size and position, and bid price whereby the Impression and Click Through IP Addresses with a predetermined relationship to a plurality of site URLs is mapped to its IP Zone, and whereby the Impressions and Click Through and Conversion data, including the IP Address, the site URL, time of day and day of week, browser type, creative ad size and position, and bid price are appended with category and domain to each IP Zone.

In accordance with an illustrative embodiment, a method includes enhancing each of the plurality of IP Zones with a series of metadata indexed score values that are derived from the frequency distributions of domain and site URLs by Zone and by Category as well as frequency of the population by Zone and by Category for browser types, device type, IP Zone user type, high bid price, low bid price, average bid price, ad size and position, day of week and time of day, each having a predetermined relationship with both the bid impression data and click through event data as mapped to the IP Zone audience.

In accordance with an illustrative embodiment, a method includes enhancing each of the plurality of IP Zones with a series of statistically indexed scores based on predictive models that include one or more of the plurality of categories, time of day, day of week, device type, IP Zone user type, high bid price, low bid price, optimal bid price, and a contextual summary score where the predictive modeling process integrates a plurality of the metadata scores to derive a holistic value having a predetermined statistical relationship with both the real-time bid address and it's IP Zone audience.

In accordance with an illustrative embodiment, a method of enhancing each of the plurality of RTB Bids by matching statistically indexed scores for audiences and media based on linking the IP Address of the bid to the IPZone for User Type and Audience and then matching the Media Zone Scores that include one or more of the plurality of categories, time of day, day of week, device type, IP Zone user type, high bid price, low bid price, optimal bid price, and a contextual summary score.

In accordance with another illustrative embodiment, a non-transitory computer-readable medium contains program instructions wherein execution of the program instructions by one or more processors of a computer causes the computer to respond to the real-time bid of IP addresses of the real-time bid to match and prioritize to a plurality of IP Zones that have been determined by location and by demographic attributes, to now include individual attribute scores for media categories, site URLs, device type, time of day. day of week, ad size and position, and bid values having received an input address where one or more of the plurality of IP zones having a predetermined statistical relationship to the input address and the frequency of the individual scores for media categories, user type, device type, time of day, day of week or bid range of the individual indexed scores.

In accordance with another illustrative embodiment, a system for delivering marketing (and/or other web-userrelevant content) includes a plurality of means, including means for the weighting variables associated with one or more IP zones each having a demographic, media categories, site URL's, bid value and time profile based on aggregating the indexed scores of said demographic, user type, media categories, site URL's, bid values and time profiles of a plurality of IP Zones based on a predetermined degree of similarity to an input of a marketing entity.

BRIEF DESCRIPTION OF THE DRAWINGS

The invention description below refers to the accompanying drawings, of which:

FIG. 11 is an illustration of application of the normalization of the weighting of indexed scores of the IP Zone Media information according to an illustrative embodiment;

FIGS. 14-16 are exemplary browser screen displays of the illustrative system implementing a "Crawler" service, in accordance with an illustrative embodiment; and FIG. 17 is a table depicting top categories with metadata scores in support of various exemplary and non-limiting embodiments of the present application.

DETAILED DESCRIPTION

Figure 1:
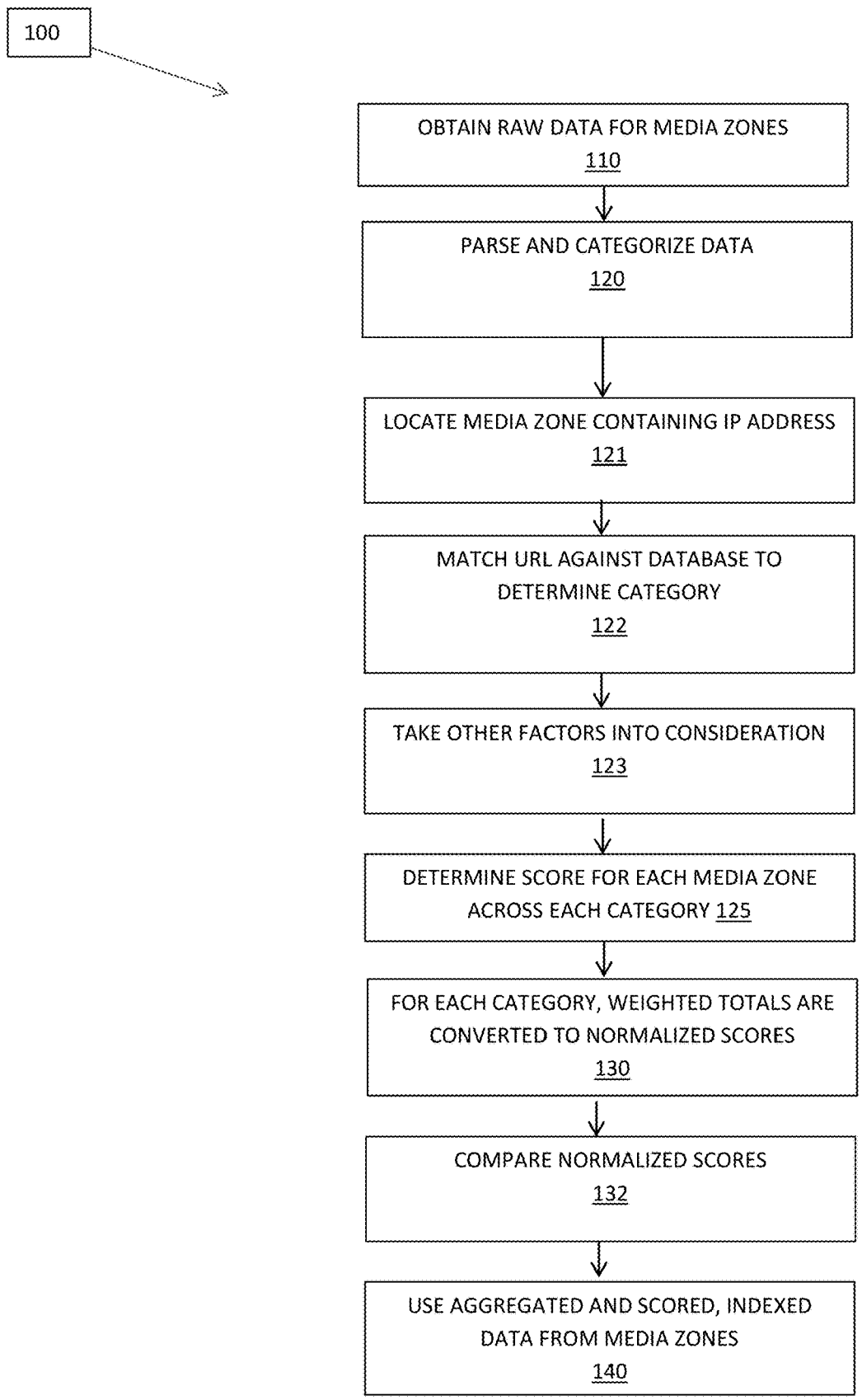
FIG. 1 is a flow diagram of a procedure for obtaining aggregated, scored and indexed data from media zones, according to an illustrative embodiment.

In accordance with exemplary and non-limiting embodiments, this disclosure describes the use of Media Zones. In some embodiments, media zones are comprised of IP zones to which additional data is appended or otherwise added. As used herein, a "media zone" refers generally to an IP zone comprising additional data. As used herein, IP zones refer to a set of enhanced IP Addresses that are linked to three or more attributes representative of a desired audience, a geographic location, a user type represented as one or more homes, businesses, schools, government institutions, medical facilities, financial or other entity, and the demographic or Firmagraphic descriptive variables that describe the audience wherein each zone is defined by multiple demographic, socio-economic, business or product attributes or variables. IP zones are more fully described in U.S. patent application (U.S. Ser. No. 13/472,528) titled, "SYSTEM AND METHOD FOR CREATING CUSTOMIZED IP ZONES UTILIZING PREDICTIVE MODELING" filed May 16, 2012, the contents of which is incorporated herein in its entirety by reference.

In accordance with an illustrative embodiment, IP Zones encompass the active population of households, businesses, schools, government facilities and wireless locations within the geography. Each IP Zone representing an online audience defined as an aggregation of individuals or households based on the scope of the IP zone that serves it. An IP Zone is not geographic, but rather virtual, based on subdivisions within a zip code, each based on a plurality of demographic and psychographic variables that uniquely defines each IP Zone.

In accordance with an illustrative embodiment, an IP Zones Audience definition system provided herein involves no tracking or placement of cookies. This means that all online users that meet an audience definition are available as inventory. Thus, the potential to reach larger, better qualified audiences based on demographics and consumer interest and purchase data improves, and does so in a more efficient, privacy friendly manner.

In accordance with an illustrative embodiment, an audience IP zone is represented as a set of IP Addresses that are linked to three or more attributes representative of a desired audience, a geographic location and a user type represented as one or more homes, businesses, schools, government institutions, medical facilities, financial or other entity, and the demographic or Firmographic descriptive variables that describe the audience. Each zone is defined by multiple demographic, socio-economic, business or product attributes or variables. Each variable is represented as a score for its concentration, value, or affinity to the user type audience is represents. IP zone audiences may be selected by their attributes or compared against one another, modeled, and prioritized by their scores and used to determine the composition of a preferred audience for advertising.

As described more fully below, in accordance with exemplary and non-limiting embodiments, Media Zones are created based on (1) a live stream of bid-stream web traffic to websites that is displaying advertising, (2) an IP address of the End User Request, time stamp, and URL captured on each visit, (3) a site URL and Domain page in the bid request, (4) the additional data elements found in the bid-stream request including the time, ad placement size and position, the referral URL, and the browser, (5) the conversion of IP addresses to their corresponding IP Zones, (6) an IP Zone Audience Characterization by Demographic Profile or by Audience Segment, (7) a classification of the site URL into one of several categories.

In accordance with exemplary and non-limiting embodiments, reference is now made to FIG. 1 showing a procedure for obtaining aggregated, scored and indexed data from media zones. At step 110, the raw data for Media Zones can be taken from an Exchange bid request stream such as Impression data from a service including, but not limited to, AppNexus, Invite, Rubicon, Right Media, Trade Desk or any other source. The Exchange platform, or more generally "Exchange" as used herein refers to an Exchange platform, such as that provided by AppNexus, a New York City-based company specializing in real-time online advertising, or any other Exchange platform that provides the infrastructure and technology for data management and other support for advertising. Of the data points on each impression bid, included is the IP address of the client machine and the URL of the site upon which the potential ad is to be placed, is recorded. These recorded elements, together with, for example, the hour of the visit (0-23), make up a single visit record as well as referral URL, ad size and position, device type are also recorded. The raw data is collected and periodically compressed and downloaded for processing. In various embodiments, there is no limit to the amount of raw data that can be collected from such bid streams to create a cache of visit records.

Once downloaded, at step 120 the data can be parsed and categorized as described more fully below. A Media Zone containing the IP address is located at step 121 and the URL is matched against an existing database of websites at step 122 to determine into which of a plurality of categories it falls. This information is then added to running totals for the each Media Zone. In this manner, over time, for example, several days or weeks, a pattern will develop where certain Media Zones will show different propensities for some categories over others. These differences are further refined by taking into account other preference-related factors at step 123, such as taking the hour of the day into consideration as well as the browser type (device), and the ad size and position. Some Media Zones may show a preference for particular categories of sites at certain times of day (e.g., financial during working hours and sports at night).

In accordance with some embodiments, the hour of the day can be utilized to subdivide categories into groups for easier handling, such as, for example, early morning, morning, afternoon, and evening. Both the hour and whatever subcategories are deem useful can be made available in Media Zones.

Once an amount of data sufficient to support robust Media Zone definition has been collected, rolled up, and analyzed, at step 125 scores are determined for each Media Zone across each category. Because traffic to different types of web sites vary greatly, raw totals cannot be used to compare categories for a given Media Zone (for example, news sites are much more frequently visited than coupon sites). However, raw totals weighted by the number of IPs in the Media Zone can be used to compare zones within a single category (for example, certain zones will show a stronger preference toward fashion sites than other zones).

At step 130, for each category, the weighted totals are converted to normalized scores. The scale can be arbitrary but is desirably consistent between categories and sufficiently granular to properly encompass the wide differences in totals. In some embodiments, a scale of 0-100 is adequate. Once all Media Zones are given normalized scores for all categories, they may also be compared with one another at step 132. A similar process which includes the time of day can be performed as well to compare the propensity for certain kinds of sites at certain times of day.

In some embodiments, in order to facilitate the use of the scores, the scores can be grouped into deciles, quartiles, or "high", "medium", and "low" divisions, for example. The numerical cutoffs can be the same across all categories or fine-tuned for each category. The same applies to scores that incorporate time of day.

In accordance with various exemplary embodiments, the aggregated and scored indexed data which make up Media Zones can be used at step 140 in different ways. For example, if an advertiser is running a campaign for a sports-related product, they can choose to target specific Media Zones which show a high preference for sports sites, regardless of what type of site the client is actually visiting. Or they can choose to target those same Media Zones only during those hours when they show a preference for sports, or just in the evening when the client is likely to be at home rather than at work. Media Zones can be used by themselves or in conjunction with the rich set of demographics available in the rest of IP Zones.

Step by Step Process

Figure 2:
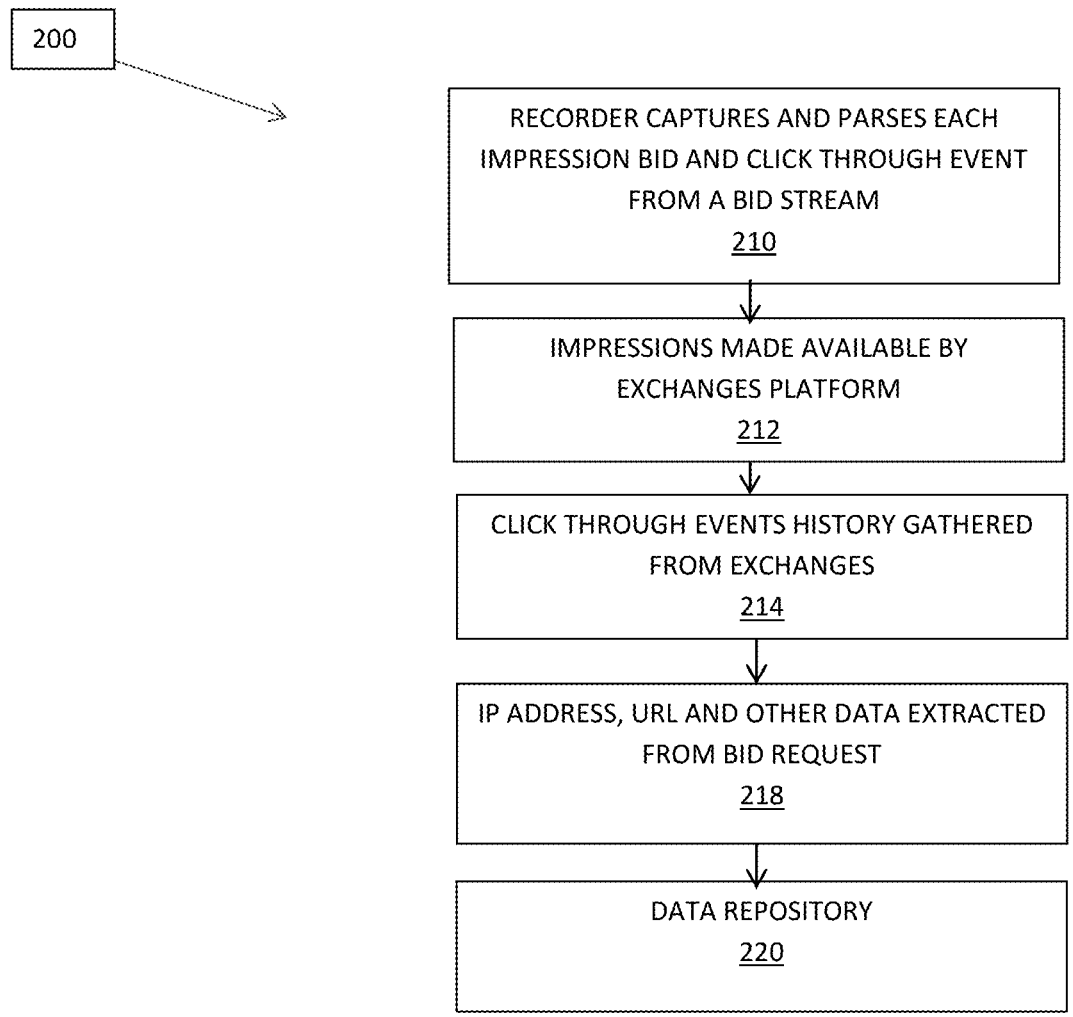
FIG. 2 is a flow diagram of a procedure for obtaining, normalizing and categorizing data regarding bid streams and/or click through events, according to an illustrative embodiment.

There is now described in detail exemplary embodiments of the process outlined above. Reference is made to FIG. 2 showing a procedure for obtaining, normalizing and categorizing data related to bid streams and/or the click through events in accordance with an illustrative embodiment. First at step 210, a real time Recorder captures and parses each impression bid and click through event from a bid stream. At step 212, for impressions the Exchanges can make the recent Impression available by downloading hourly batch history or the Recorder can mimic the behavior of a real data provider bidder, so it is necessary to immediately respond to all bid requests with a "no bid" response. At step 214, for Click Through Events the history can be gathered in hourly batch downloads from the Exchanges. At step 218, from the bid request, the client's IP address and the URL of the visited site can be extracted as well as a referral URL, the time, ad size and position, and browser type. In some embodiments, there is saved up to, but not including, any query parameters that can be contained in the URL. A delimited string containing this data can then be written to a text file.

At step 220, at periodic intervals, regulated by the number of records (determined by an optimal or preferred file size), the file may be compressed and securely copied to a data repository. Data collection can continue at an Exchange like AppNexus in a new file which can be downloaded in batch at a later time.

At step 222, a process is executed to decompress the file then process each delimited line of data. The IP address can then be converted into a Media Zone at step 224 as described more fully below. The URL can then be parsed and categorized at step 226 as described more fully below.

Next, the process continues by running totals for each category for each zone and hour and periodically updates the database with the totals.

Then, once sufficient data has been collected, at step 230 the totals for every Media Zone are taken for each category and a normalized score is given to every Media Zone for each category as described more fully below.

At step 240, the normalized category scores are further bucketed into a hierarchy of larger to smaller groups. Both the normalized scores and the bucketed scores can be available for use by customers.

In accordance with exemplary and non-limiting embodiments, the IP to Media Zone Conversion Process described above proceeds as follows. In IP Zones, each zone represents a range of one or more IP addresses. For each zone, the raw IP addresses that mark the begin and end values of the range (IP_BEGIN and IP_END) are stored. In addition, the integer representation of those IP addresses (IP_INT_BEGIN and IP_INT_END) are stored. A specific IP address from an Impression or Click Through Event will fall into one and only one IP zone, as there is no overlap between the different zones.

To convert an IP address into its numeric equivalent:

Assuming the IP address to be "aa.bb.cc.dd", multiply out the components of the address as follows:

longval=(16777216$L$*Long.parseLong($aa$))+
(65536$L$*Long.parseLong($bb$))+(256$L$*Long.
parseLong($cc$))+Long.parseLong($dd$);

This algorithm will produce a number which may fall within one of the zones between the IP_INT_BEGIN and IP_INT_END values of a zone.

Then, in order to perform a fast lookup of a zone given an IP address, a binary search is performed into a memory-resident Java array of ordered IP_INT_BEGIN values of all of the zones. If we find an exact match of the value, then we know we have found the proper IP zone. If there is not an exact match, one checks to see if the result is less than or equal to the IP_INT_END value for the IP zone, which is kept in a corresponding memory-resident array of ordered IP_INT_END values. If it is, the IP zone of the IP address has been identified. If not, the IP address falls outside of known IP zones.

Parsing and Categorization of URLs

In accordance with exemplary and non-limiting embodiments, the Parsing and Categorization of URLs described above proceeds as follows. Though it would be a computationally difficult task to categorize each and every web page or even every domain on the Internet, categorizing a relatively small number of domains, sub-domains, and site URL pages can provide coverage the vast majority of page visits seen through the bid stream on Exchanges.

Figure 3:
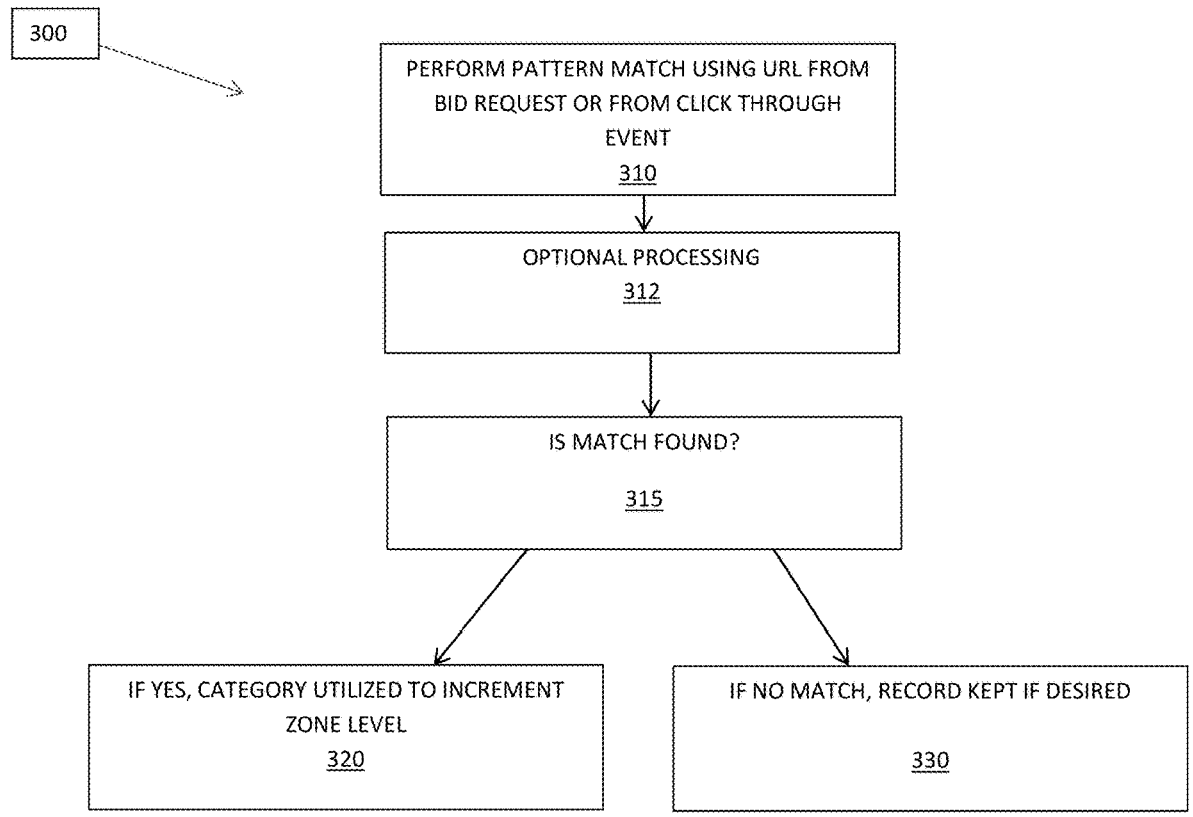
FIG. 3 is a flow diagram of a procedure for parsing and categorizing URLs, according to an illustrative embodiment.

Reference is made to FIG. 3 showing a procedure for parsing and categorizing URLs, according to an illustrative embodiment. At step 310, taking the URL from the Impression bid request or from a Click Through Event, a pattern match can be performed to see if it is contained in the database of categorized domains. at step 312, some preprocessing of the URL can be necessary based on what is seen in the live data. At step 315, it is determined whether a match is found. If a match is found, at step 320 the category can be utilized to increment the proper zone total. In some embodiments, at step 330 it is beneficial to keep a record of URLs that do not match so as to identify popular sites that have yet to be categorized in the database.

Examples of categories with key words include, but are not limited to those reproduced below in table 1, table 2 and table 3.

Category Score Normalization

To produce normalized scores (ns) across zones for a specific category, one can take the totals for each zone and find the minimum (min) and maximum (max) values. Then apply the following formula to the total (t) for each zone: $ns=(t-min/max-min)*100$. This will produce scores in a range of 0 to 100.

From here, there are various ways scores may be subdivided. Straight quantiles, quintiles, or deciles may work well based on the distribution. However, if the scores are not well distributed, it may make more sense to apply different cutoff values. In some embodiments, one may apply custom cutoff values for each category. An analysis of real data collected over a sufficient period of time should make it clear which method or methods will work best for subdividing the scores.

Raw Impression and Click Through Event Data Processor

Once the compressed delimited raw data files have been transferred to the data repository, they may be decompressed and parsed by the Raw Data Processor.

Each line of the data file comprises a single bid request and may be of the form:

<hour> <tab> <ip> <tab> <url> <tab> <h> <tab> <w> <tab> <p> <tab> <br> <cr>

<hour> is an integer from 0 to 23, representing the hour of the day

<ip> is an IP address of the form aa.bb.cc.dd

<url> is the base URL possibly including subpage, though not query parameters <h> is the height in pixels of the ad placement <w> is the width in pixels of the ad placement <p> is the position on the page of the ad placement <br> is the browser type on which the ad will be displayed The IP address and each subsequent field < > in the bid stream is incremented and appended to a converted to a zone value and the category of the URL is determined (see the preceding sections for details). If the lookups are successful, the appropriate totals are incremented.

Exactly what totals are tracked for each zone needs to determined, but may include raw category totals, hourly category totals, and/or subdivided totals based on time of day, etc.

In accordance with various embodiments described above, the IP address was converted to an integer value at the time of processing rather than at the moment of recording. The reasoning for this is that the collected data would become at least partially obsolete as the zone values in IP Zones were periodically updated. By storing the IP values instead, one can reprocess previously collected data for each update of IP Zones.

In accordance with some embodiments, it may be necessary to establish a predetermined amount of time to go back and reprocess the raw data when doing an update, since it seems likely that category preferences for zones may change based on the time of year or other factors like shifting demographics.

In some embodiments, in addition to recording the hour of each bid request, one may consider tracking the day of the week, day of the month, or month of the year for further refinement purposes.

In some embodiments, the amount of a URL stored at the time of recording may vary from URL to URL. For example, a URL may run from a handful of characters containing just the base domain (or nothing useful at all) to several hundred characters containing nested sub-pages and query string values. Simply using the base domain when determining the category is the simplest way to process such URLs, but in some cases such as yahoo.com/news and yahoo.com/sports one may wish to exercise more finesse when categorizing.

Figure 7:
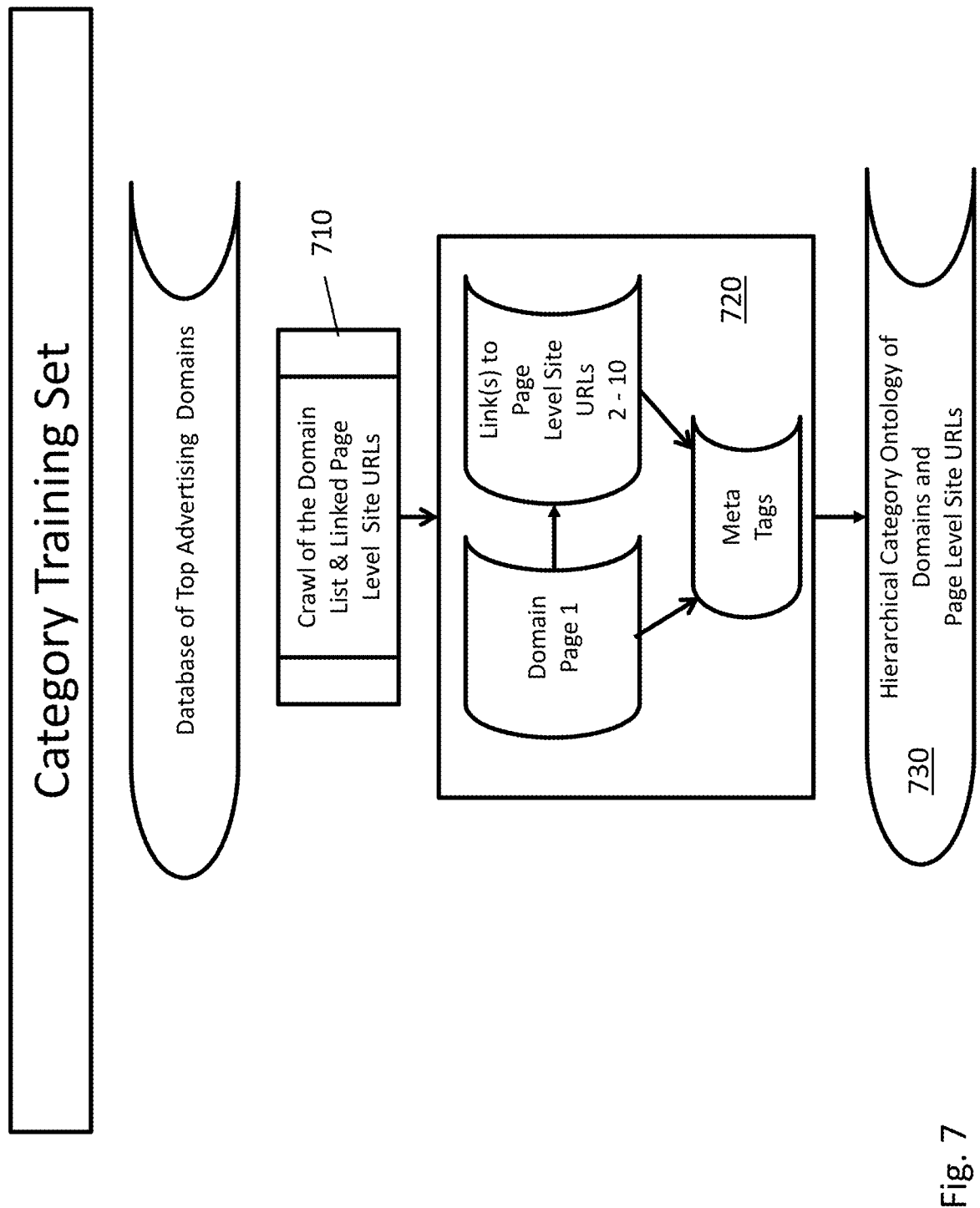
FIG. 7 is a block diagram depicting an illustrative embodiment of elements and steps involved in building a reference ontology database inclusive of the domains, URL links, the Key Words and the Meta Tags identified through a crawling of pre-identified domain list using said domains and link of the top advertising supporting sites.
Figure 8:
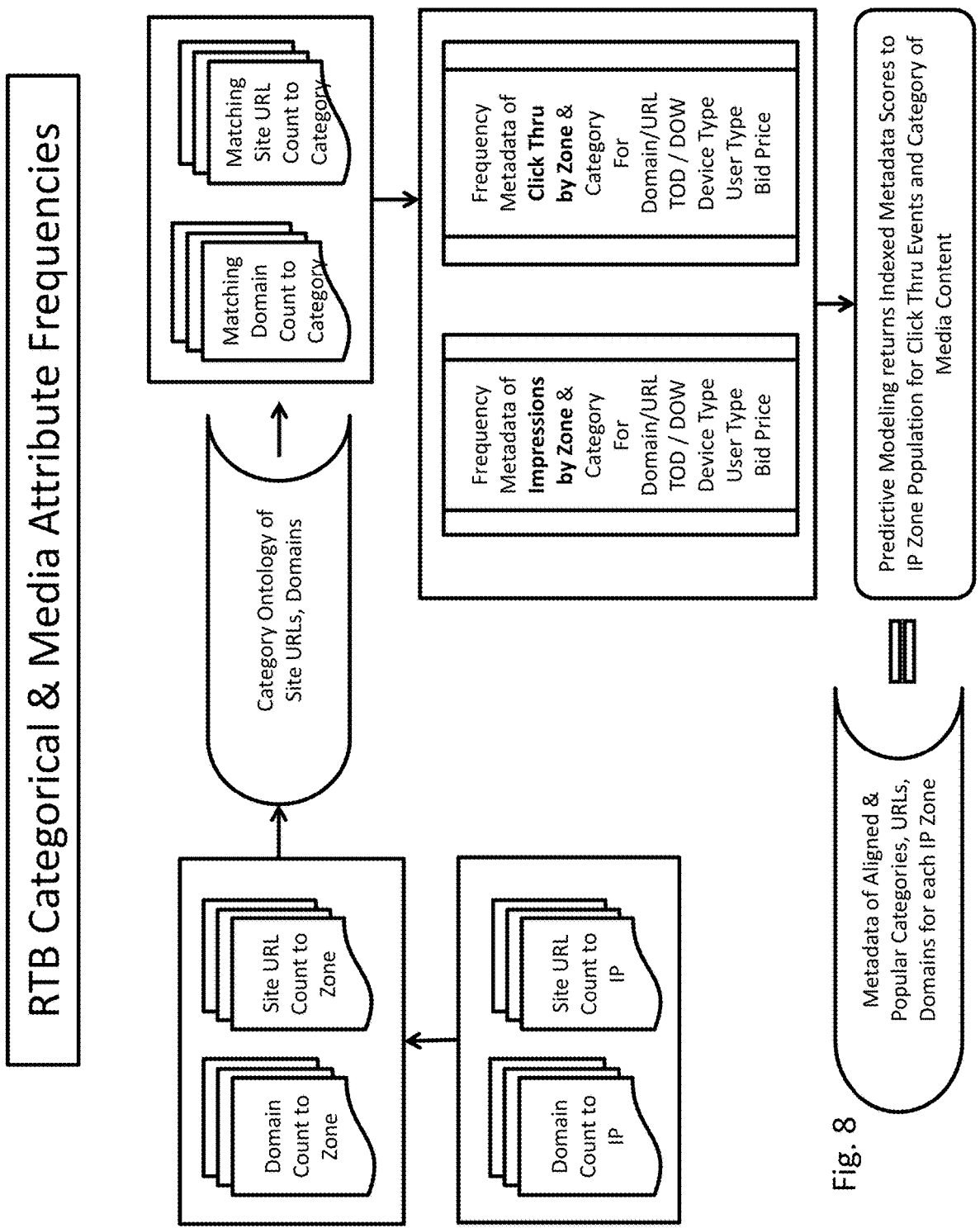
FIG. 8 is a flow diagram depicting exemplary elements and steps involved in enhancing and assigning frequency metadata score values to IP Zones and the categories, domains and site URLs, collected by the RTB Recorder for Impressions and Click Through Events based, in part, on the application of the Predictive Modeling Index Scoring process.

In accordance with some embodiments executing IP Media Zones, one may initiate a crawling exercise 710 (see FIG. 7) to go to each domain page, and then view source, then capture all of the http://domain.com/links where the "links" are also Meta-tags as "key words" 720. In such instances, Key words might then be used to create "pools" of relevant words that reference categories. So in addition to ability to create preferred "white page" target site pages for advertising we could also create word pools for adwords advertising. When a hit for washingtonpost.com/sports references sports that page goes into the sports category. Each Exchange has a list of categories that they organize their domains and site URLs by and the incorporation of the Met-tag key words allows for the mapping of the Media Zones categorization schema to that of the specific Exchange.

Figure 4:
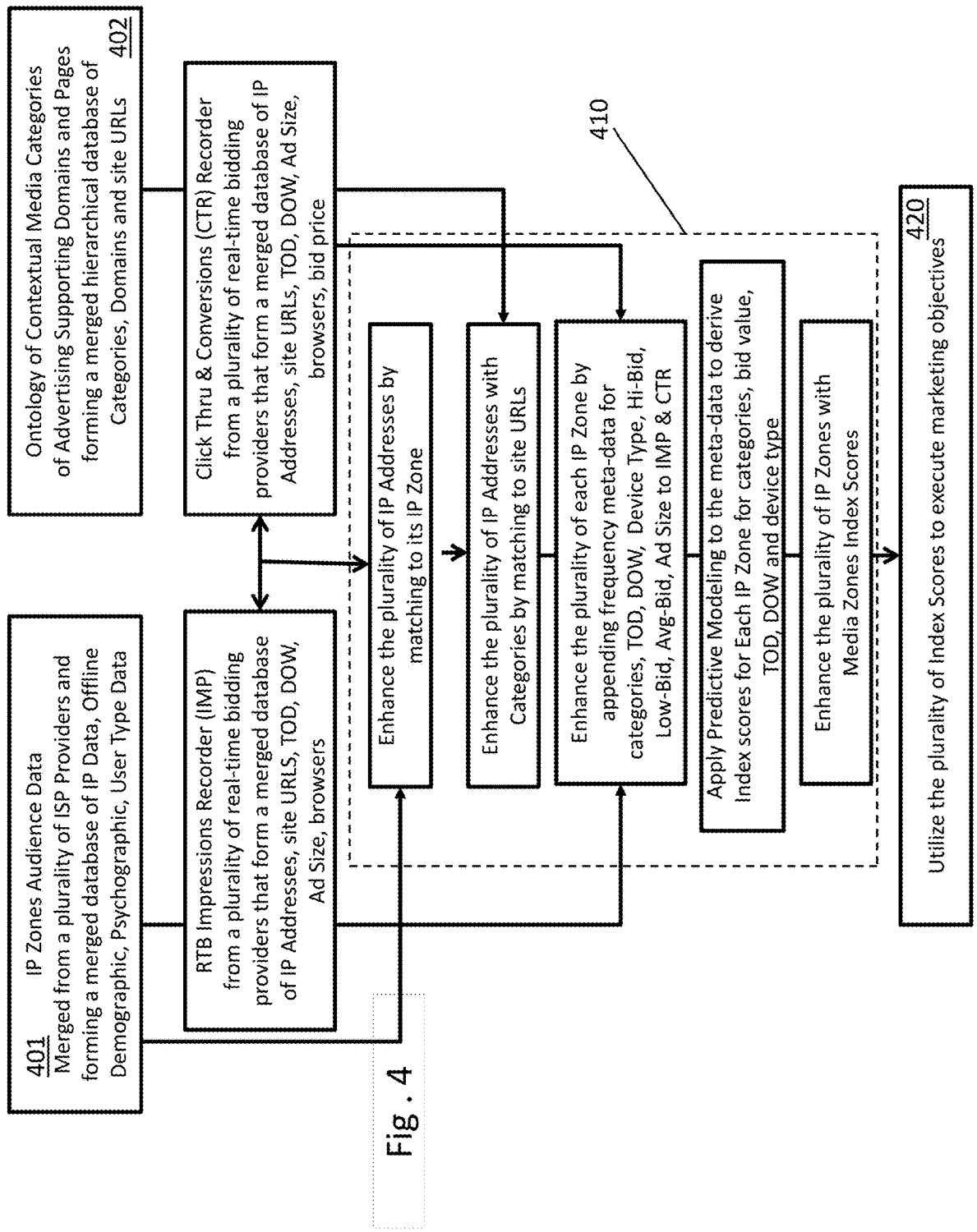
FIG. 4 is a flow diagram of the illustrative embodiment.

As shown in FIG. 4, in accordance with exemplary an non-limiting embodiments, there is disclosed a system that uses IP Zone based audience data 401, including information collected by the ISPs regarding account registrations, network design and performance characteristics of the ISPs, home demographic data and business Firmagraphic information, are used with categorical media data 402 that is collected from the ad networks, disclosed as a system where web site content, including URL's, information contained in the URL's, and key words harvest from the pages of those URL's, to improve advertising accuracy as is henceforth described in detail with reference to FIGS. 4-13.

According to an exemplary and non-limiting embodiment, shown in overview in FIG. 4, a system is provided for building IP Media Zone data and applying it in the targeting process for advertising preference selection of audiences. IP Media Zone data may, for example, include the domain of a plurality of the web sites that support advertising, the categorical descriptions of a ontology of advertising supporting sites, and the descriptive demographics of the Internet users who frequent the sites within a category. The attachment of descriptive demographics to an IP Zone and to an IP Media Zone by weighted value, and the application of ranked IP Zone and IP Media Zone attributes may create a target audience linked to a target domain and site URL destination.

Figure 5:
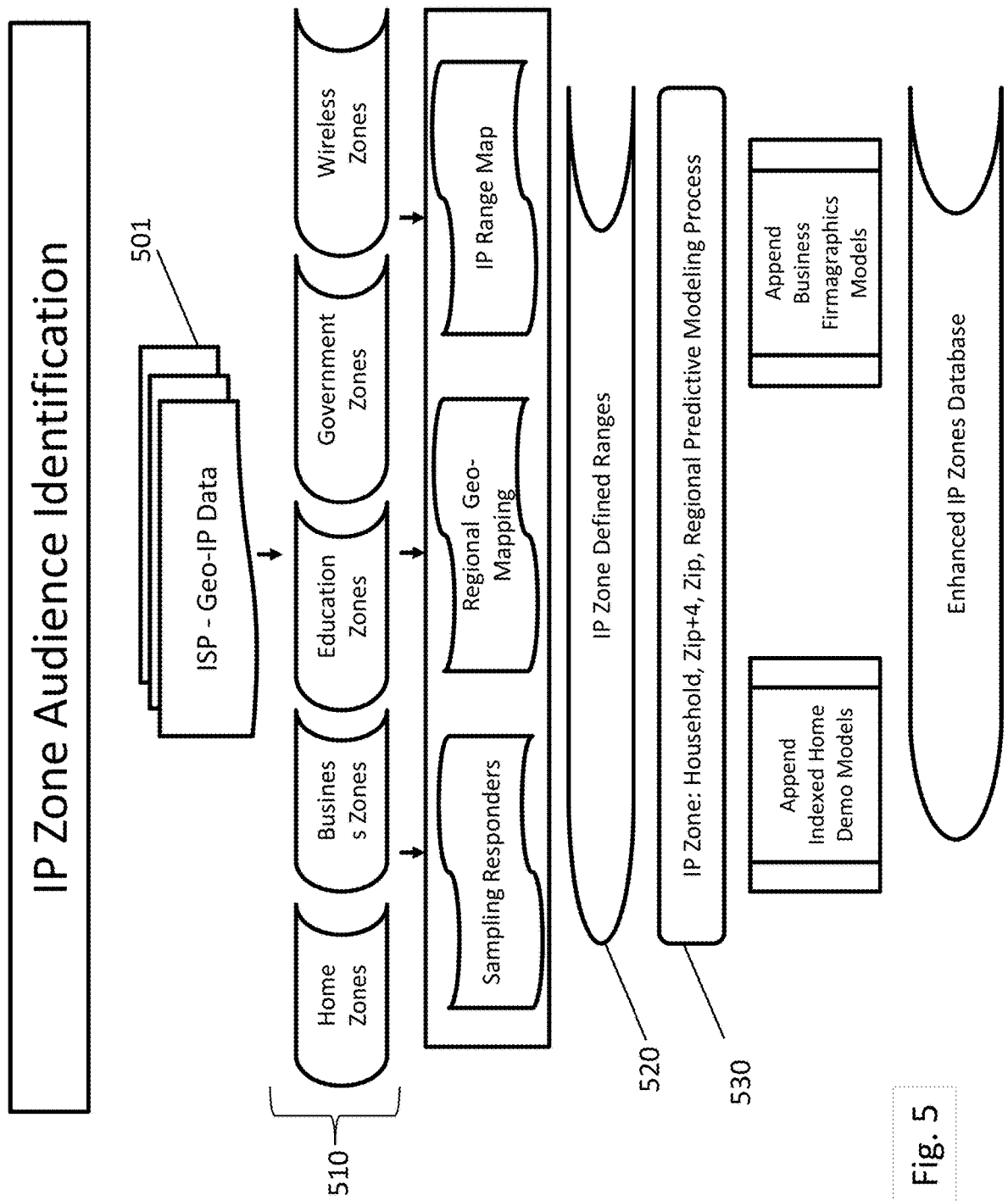
FIG. 5 is a block diagram depicting an illustrative embodiment of elements and steps involved in using data from Internet Service Providers to build out User Type designations and apply them to the creation of IP zones, and the steps involved in enhancing the IP Zones Audiences including the integration of location, demographic, socio-economic and other entity segments through the application of predictive modeling according to an illustrative embodiment.

With reference to FIG. 5, the IP Address data 501 can be updated periodically in order to remain current relative to user types 510 of Home, Business, Education, Government or Wireless assignment. IP addresses may be stored in "ranges" 520 that detail the BEGIN and END IP numbers for each range. The approximate geographic location, Internet speed, service provider, user type, demographic variables and business category, etc., are stored in the merged database for each range, or IP Zone 530.

As used herein, the term "ontology" refers to the online harvesting and grouping of IP domains, key words and IP Addresses that are classified and stored in a merged database the derivation of which is described more fully below. The ontology data may be updated periodically in order to remain current relative to user types of Home, Business, Education, Government or Wireless assignment. The ontology data is defined in a process that statistically pairs the site domain, site URL's and the links on the top level pages to categorical ontological descriptions that are in turned derived from the frequency of the Meta-tag data words and the Links on and between those pages. Ontology data is stored within a hierarchical database as scored categories with top level categories being the most frequently occurring contextual relevant terms that are linked to web site URL pages, top level domains. Each Impression web page and it's top level domain is linked to the IP Address of the originator (end user) who initiated the ad network feed call and those IP Addresses are aggregated into IP Zones that bind the IP Address into ranges that form IP Zones.

As used herein, the term "Meta-tag key words" refers to an online harvesting and grouping of IP domains, Meta-tag key words and IP Addresses that are classified and stored in a merged database the derivation of which is described more fully in paragraphs below. The Meta-tag data may be updated periodically in order to remain current relative to user types of Home, Business, Education, Government or Wireless assignment. Meta-tag data is derived from the coded HTML of top level domains and the linked web site pages by harvesting the words on each of the pages and performing a frequency count on those words. The highest frequency words are stored in a hierarchical database of scored elements that contribute to defining the ontological categories, shown in FIG. 8. Meta-tag data frequency data is stored within a hierarchical database as scores derived from the most frequently occurring contextual relevant words that are linked to an ontological category of site URLs and domains. Each ontological category is then statistically linked to the IP Addresses of the occupants of each IP Zone based on the binding of the IP Addresses into ranges that form IP Zones.

In accordance with illustrative embodiments, a database of harvested IP domain addresses, Meta-tag key words, categories, and IP Zones are linked through an enhancement process 410 (see FIG. 4) that uses offline sources of demographic and Firmagraphic data, respectively. Once enhanced, the IP Zones are used to facilitate advertising and marketing objectives 420. In one embodiment, exemplary or sample customer identities are provided by a potential advertiser and linked to their IP Zone. Statistical modeling is performed to identify IP Zones as having demographic characteristics similar to those of the sample customer identities. The IP Zones, so identified, can then be used to target advertising to individuals and audiences navigating the internet by targeting those IP Zones.

Figure 9:
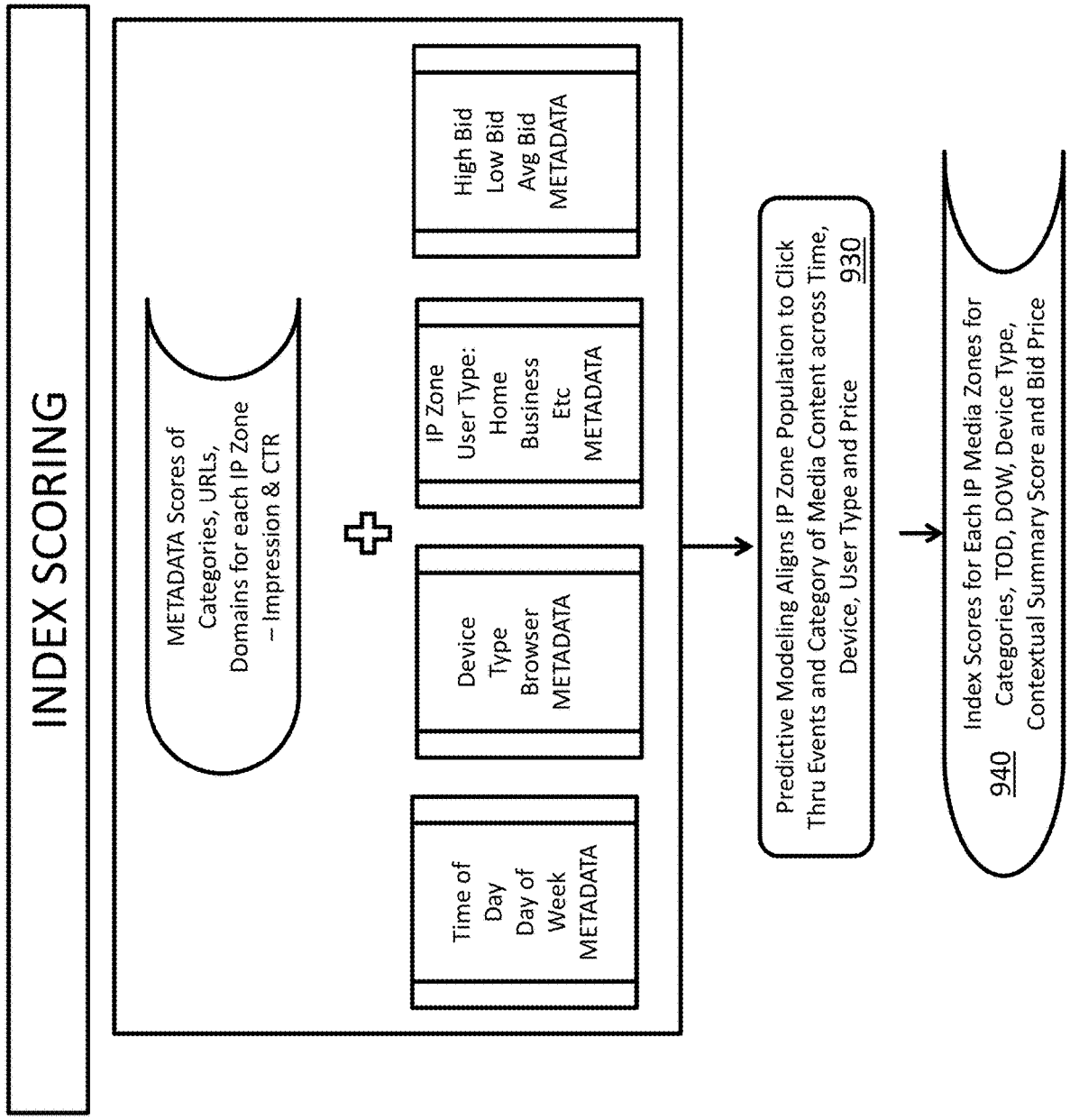
FIG. 9 is a flow diagram depicting exemplary elements and steps involved in scoring and indexing the RTB Recorder supplied data including IP Addresses, domains, links, key words and meta tags by in order to assign normalized values to the predetermine categories and to produce score variables related to said categories across multiple vectors for application is weighting the real-time bidding values that produce an audience based on an advertiser request.

In accordance with illustrative embodiments, a database of ontological categories are derived from domains, site URLs and Meta-tag key words that are harvested from the ad network advertising data feed as Impressions and Click Through Events. Categories are linked to IP Zones that are enhanced by offline sources of demographic and Firmagraphic data, respectively. The IP Zones, once enhanced with the category data are used to facilitate advertising and marketing objectives. In one embodiment, exemplary or sample customer identities are provided by a potential advertiser and statistically linked to the IP Zone. As shown in FIG. 9, statistical modeling is performed at 930 to identify IP Zones having demographic characteristics similar to those of the sample customer. Each of the IP Zones identified as having the appropriate demographic characteristics are then also ranked and prioritized by a category score. A category score 940 is derived from harvesting the ad network data feed where each IP Zone audience is measured against the frequency and modeled score for each IP Address linkage to a category. The IP Zones so identified can then be used to target advertising to individuals navigating the internet by targeting those IP Zones and the category derived from the domains, site URLs or key words that inform the scores.

Figure 10:
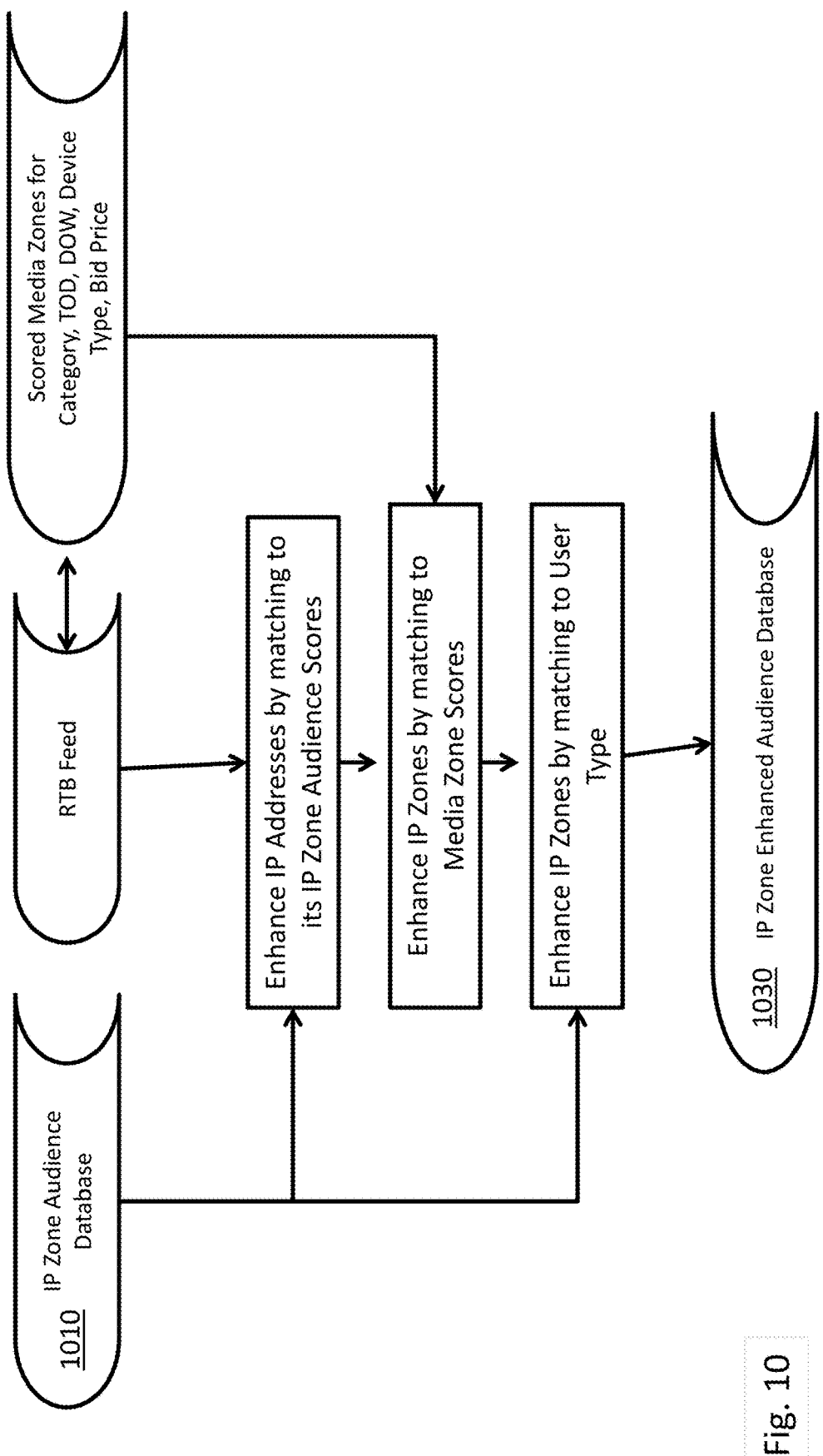
FIG. 10 is a flow diagram of an illustrative embodiment of a method of matching the RTB feed utilizing identified IP Zone Audience Data, the enhanced Scored Media Zones Data, to create a unified enhanced IP Zone database.

According to an illustrative embodiment shown in FIG. 10, a system is provided for mapping the IP Media Zone categories 1010 to the IP Address, IP Zone, the domain URL and the site URLs on the page. An ad network bidder feed request includes the URL of the page where the ad will be served, the IP Address of the user visiting that URL, the time of day, ad size and position and the browser type. The system captures these fields and logs them into a database 1030.

According to an illustrative embodiment shown in the accompanying figures, a system is provided to link the URL of the requestor to a URL categorization and classification process. The embodiment of the URL classification process includes the scanning of the Meta-tag words on the URL page as well as the scanning of the links on site URL and the top level domain URL. A method is provided for determining the categorical ontology for the system. A baseline of top level URLs in the form of domains that support advertising are provided as a baseline through a manual process. This baseline of URLs is scanned for the URL links as well as the key words found on the pages referenced by those URLs. A collection and extraction process is employed to parse the top level URL, parse and navigate to URL links referenced on the top-level, and then extract Meta-tag key words from those pages where using statistical frequency of the Meta-tag key words found on a page or within the link reference are used to rank order the IP Address and IP Zone for its strength of association with one or more categories.

Figure 6:
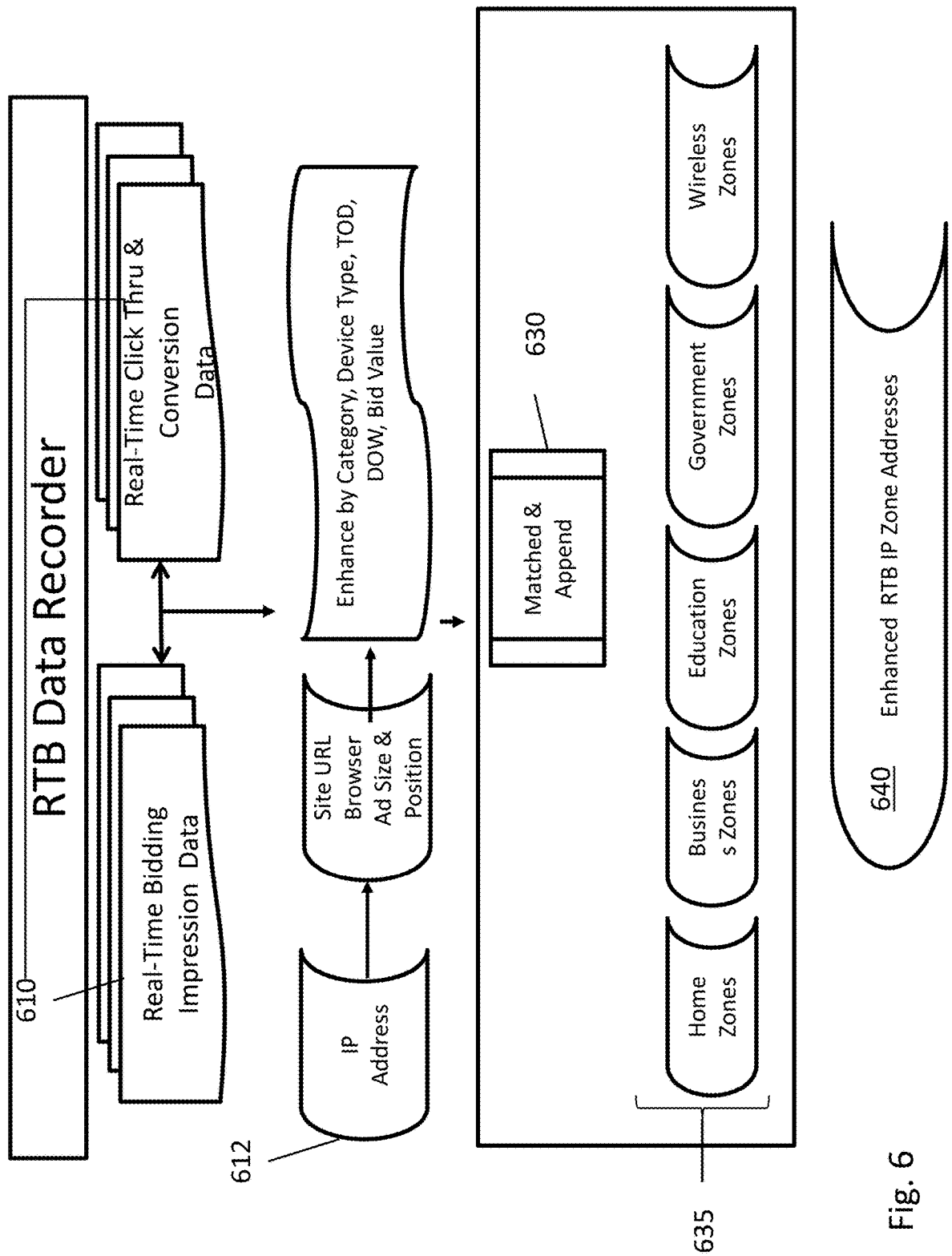
FIG. 6 is a schematic diagram depicting an illustrative embodiment of elements and steps involved in using data from the Ad Networks and Real-Time Bidder platforms to build out a RTB Recorder database of IP Address bids, collecting in process the destination URLs and domains each ads will appear and then matching and appending the User Type designation of said IP Address.

According to an illustrative embodiment shown in FIG. 6, a method is provided for the scoring of each IP Zone by a normalized score for the metadata elements of Categories, URLs, domains Meta-tag key word and other elements such as Time of Day, Day of Week, Device Type/Browser, User Type, and the High/Low and Average Bid amount of each impression and click through event. To produce normalized scores (ns) for each method across each of the IP Zones, a method totals each zone and find the minimum (min) and maximum (max) values. Then apply the following formula to the total (t) for each zone: ns=(t−min/max−min)*100. The calculation produces scores in a range of 0 to 100. The system provides different methods for aggregating the normalized scores in order to assure that the scores are well distributed based on the scale of the range for each piece of metadata. The system supports method for providing custom cutoff values for each category in order to assure a normal distribution of traffic that is an indicator of real traffic flow. An analysis of real data collected over a sufficient period of time helps to determine which method or methods will work best for subdividing the scores.

Figure 12:
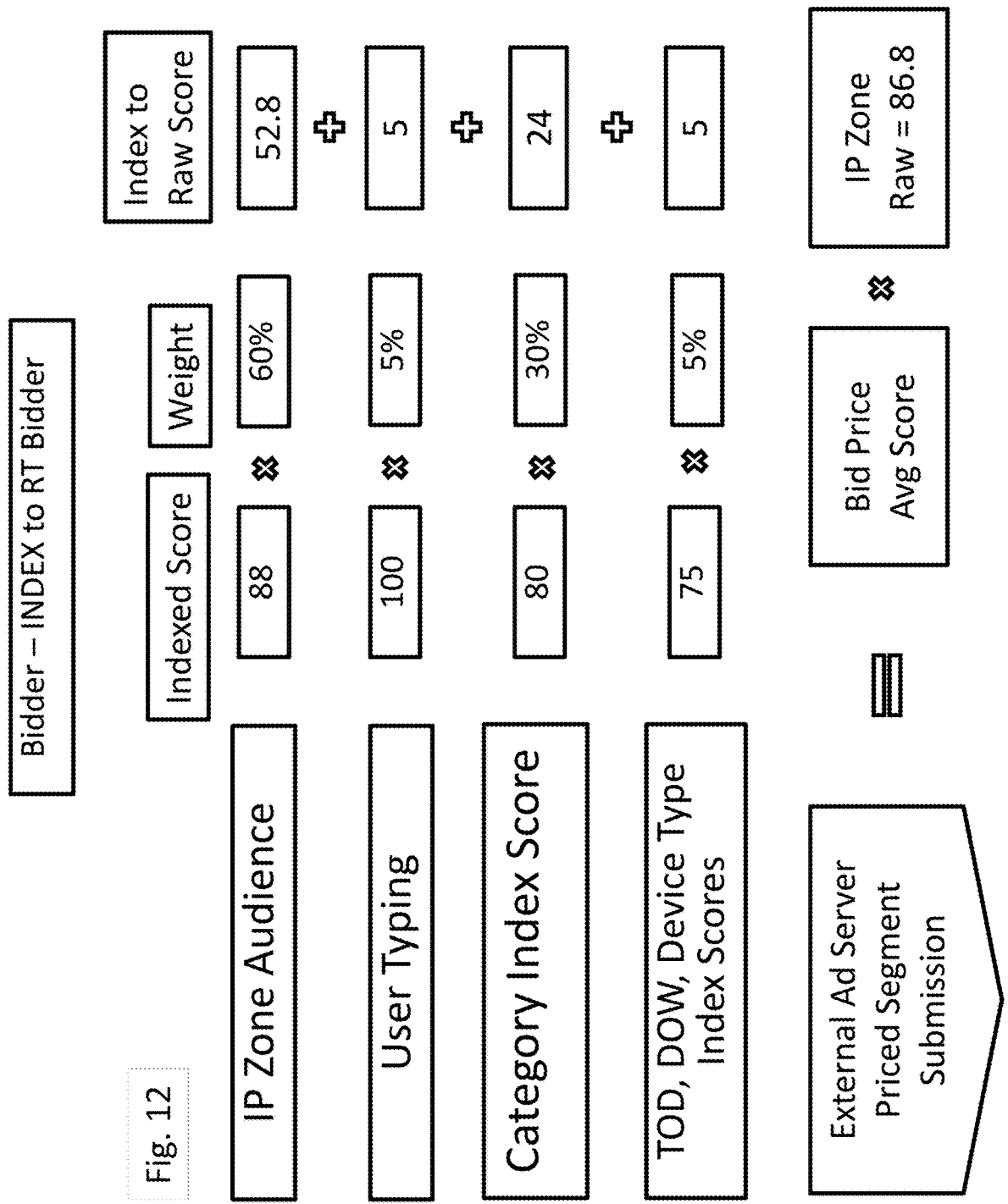
FIG. 12 is a flow diagram depicting exemplary elements and steps involved processing the indexed scores and normalizing them as an individual IP Zone Raw score which can then be included as a variable in the pricing decision associated with IP Zone segments that act on media as a real-time bid from the ad server.
Figure 13:
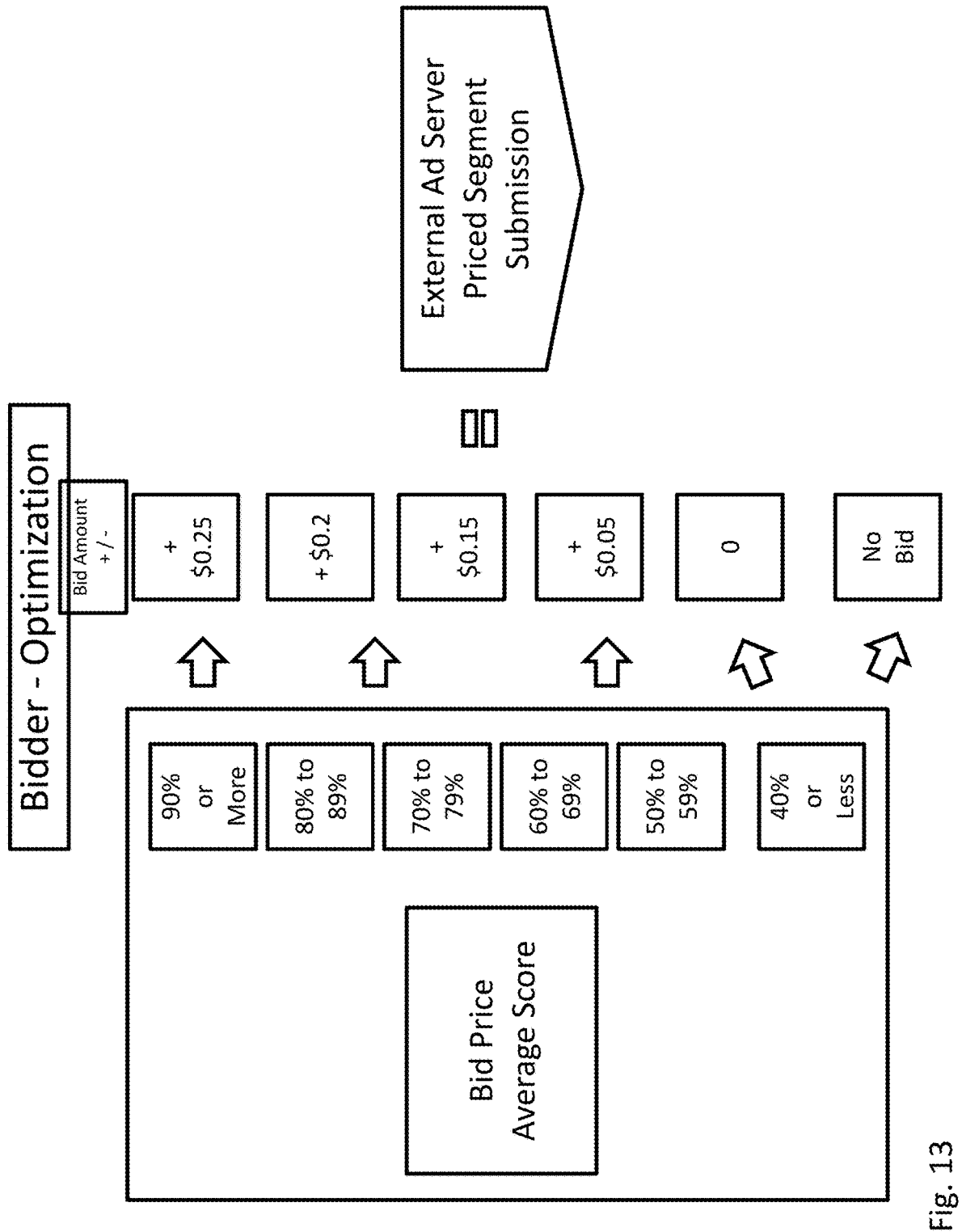
FIG. 13 is a flow diagram of the bidding system whereby the real-time bid from the ad server is processed and optimized by increasing the bid value, decreasing or not bidding based, in part of the application of the weighted values predetermined through the system.

According to an illustrative embodiment shown in FIG. 9, a method for scoring the individual metadata elements and linking those scores to IP Zone for Categories, URLs, domains Meta-tag key word and other elements such as Time of Day, Day of Week, Device Type/Browser, User Type, and Bid amount allows for application of predictive modeling by which the normalized metadata elements are applied to derive a single statistical score of the impression in the real-time bid feed whereby that score can be utilized to automatically delineate the IP Zone Audience Segment groupings for a campaign as well as determine the optimal bid price to associate with each segment per FIG. 12-13.

With reference now to FIGS. 11-13, there is shown a high-level overview of an illustrative embodiment of the method/process where the bidder feed comprised of the URL of the page, the IP Address of the viewer of the page, browser type, ad size and location, and the time of day which is assigned on delivery of the bid, are read, collected and processed over an extended period time in order to create a normalized collection of entries at a high-level for each IP Media Zone, and where the statistical frequency of an IP Media Zone can be associated with. and appended to, the IP Zone record for the improvement of future audience selection.

As is therefore evident, this present disclosure overcomes disadvantages of the prior art by providing a plurality of systems, methods and non-transitory computer-readable medium that combines custom audience identification in the form of IP Zones that have been derived from off-line information with predictive modeling and segmentation by ISP, user type, demographics, timing, propensities and business attributes with media identification and classification, linking IP Zones audience identification with a system for media identification where online contextual information is derived from a plurality of systems that combine a categorical ontology of domain addresses and Meta-tag key words with a real-time bidding platforms 610 that provide attributes including the URL, the content of the web page, the IP Address 612 of the requestor, the media type, browser type, and time of day whereby the content of the domain web page is automatically classified and scored 630 as to its relevance to a contextual category type 635 and then to its statistical relevance to the IP Zone audience 640.

Figure 14:
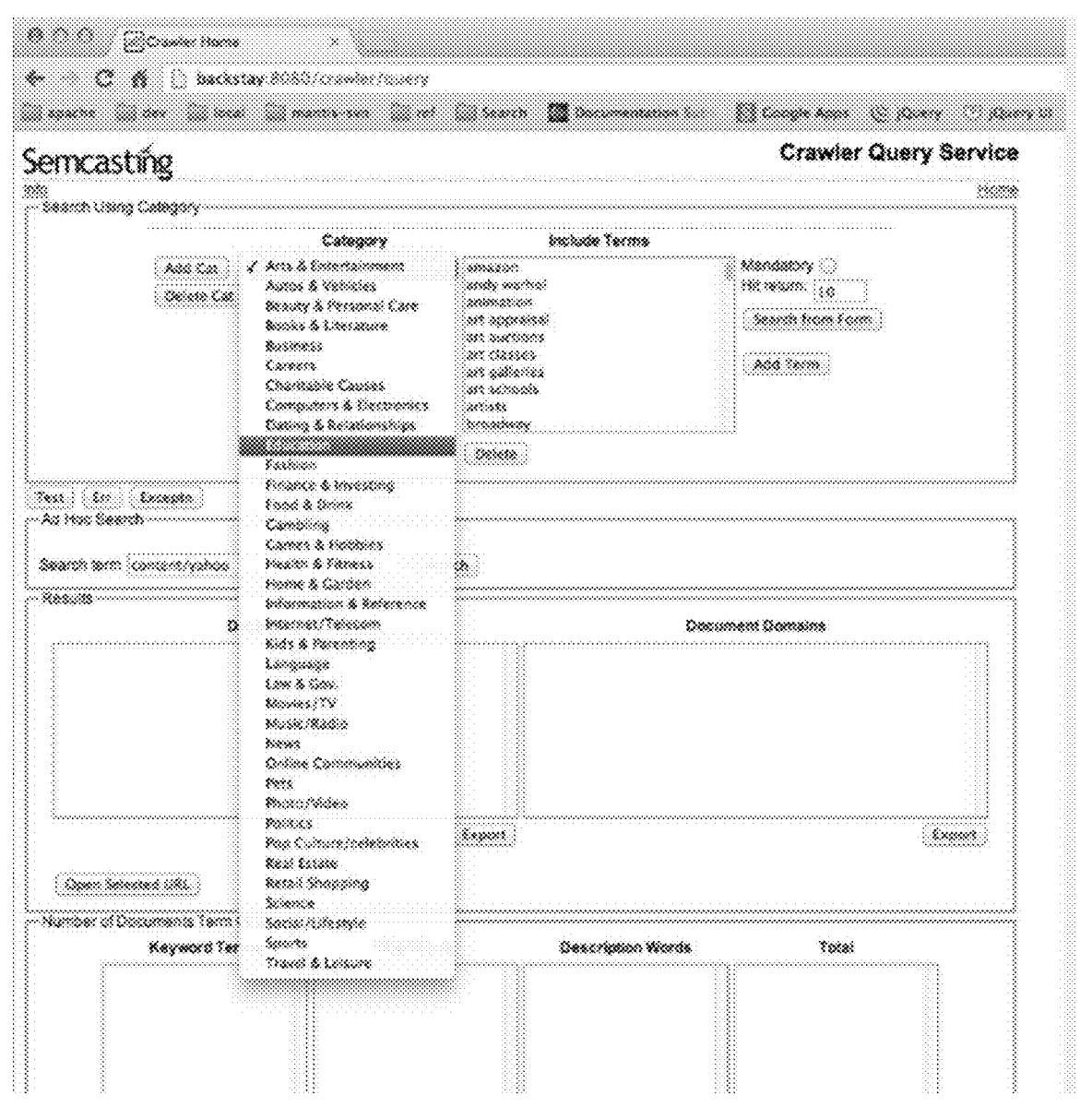
Figure 15:
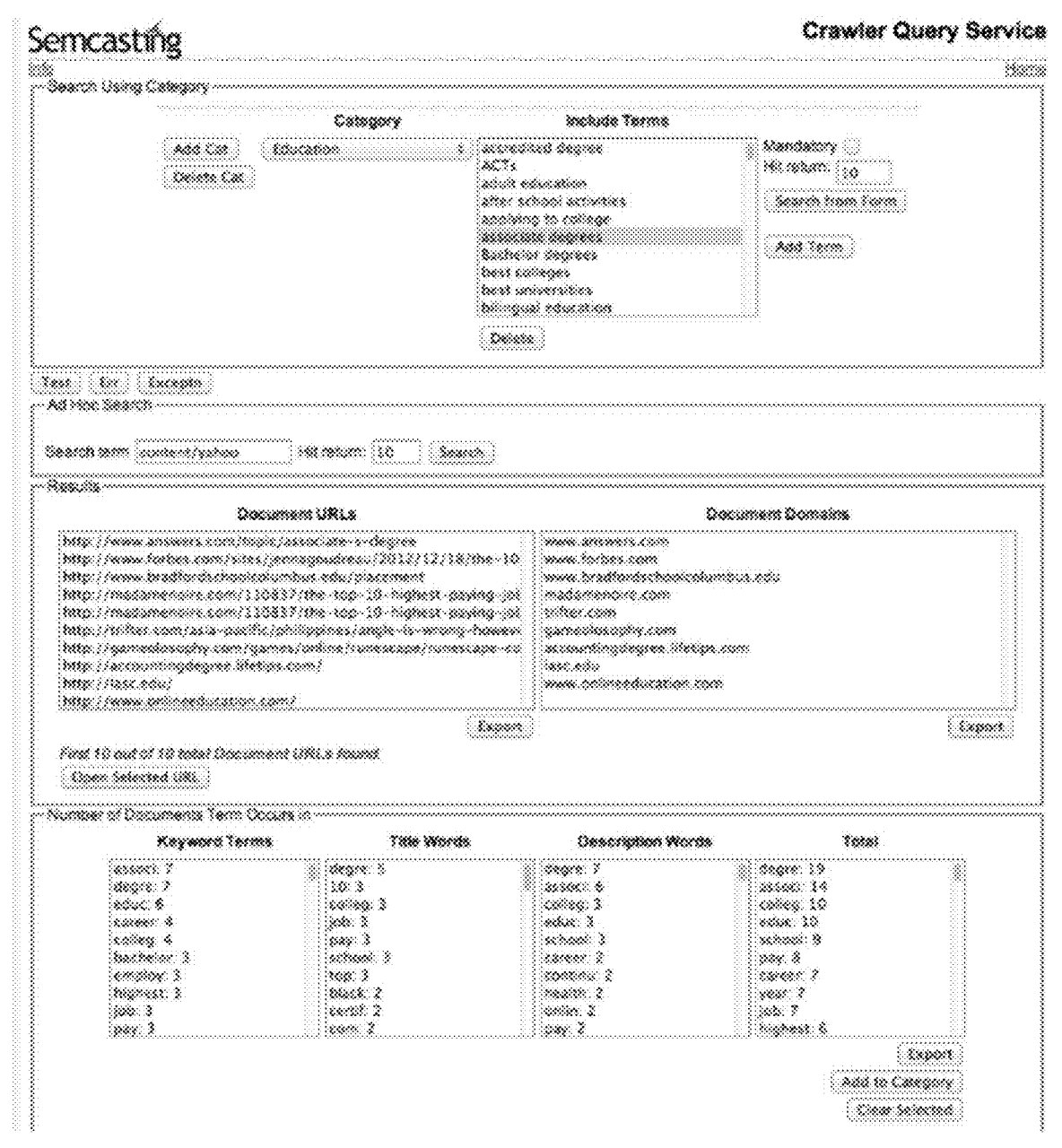
Figure 16:
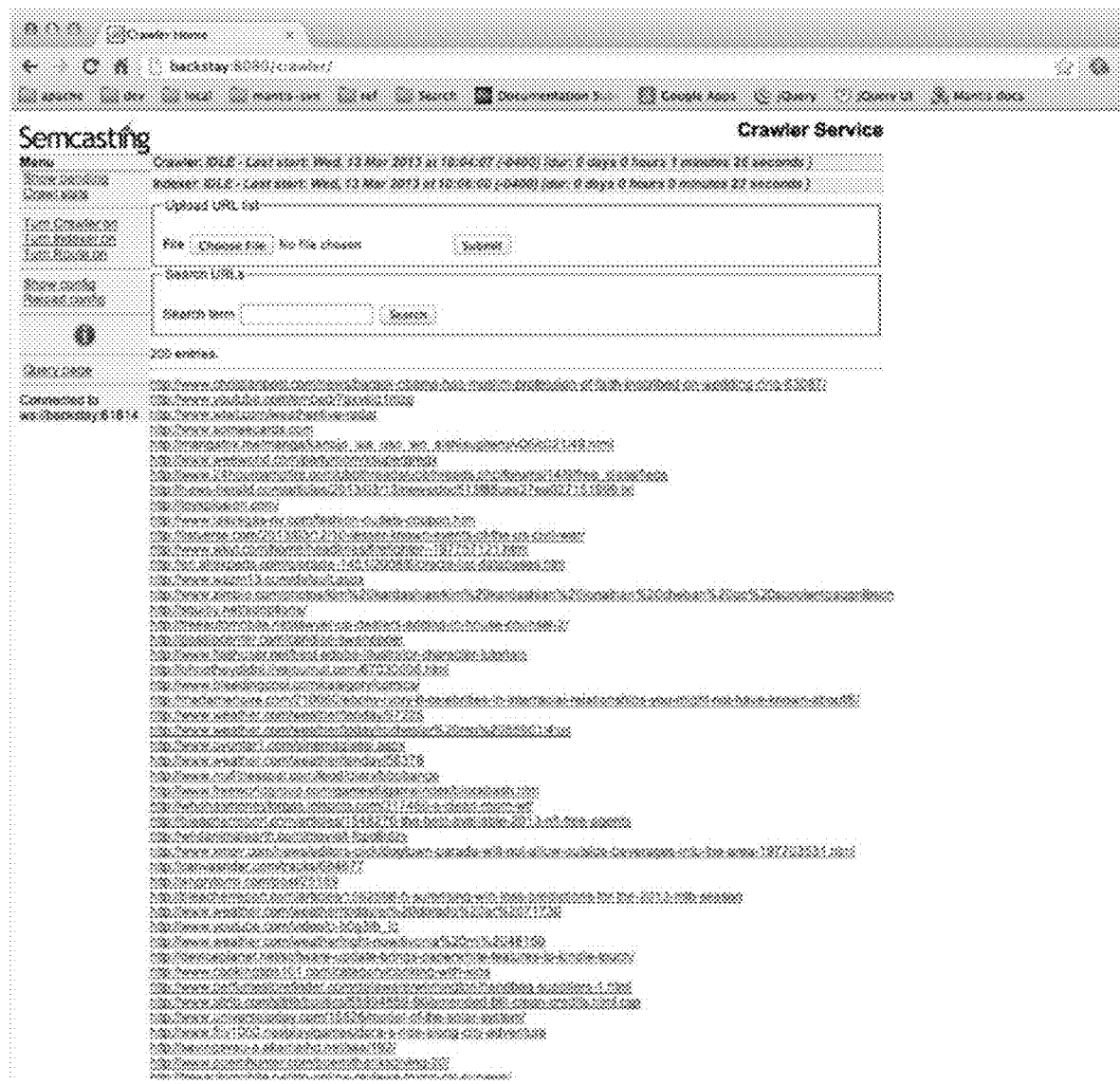

FIGS. 14-16 show exemplary browser screen displays of the system in operation, including a categories with key word library example in FIG. 14, showing the various drop-down menu options in FIG. 15 and an exemplary result of performing the crawler service is shown in FIG. 16.

The following tables, as well as Table 3 depicted in FIG. 17, support various exemplary and non-limiting embodiments described above.

TABLE 1

| Top Level Categories | |
|---|---|
| 1 | Shopping |
| 2 | Health |
| 3 | Reference |
| 4 | Business & Industrial |
| 5 | Online Communities |
| 6 | Food & Drink |
| 7 | Arts & Entertainment |
| 8 | Travel |
| 9 | People & Society |
| 10 | Finance |
| 11 | Hobbies & Leisure |
| 12 | Home & Garden |
| 13 | Real Estate |
| 14 | World Localities |
| 15 | Computers & Electronics |
| 16 | Books & Literature |
| 17 | Beauty & Fitness |
| 18 | Internet & Telecom |
| 19 | Science |
| 20 | Pets & Animals |
| 21 | Sports |
| 22 | Autos & Vehicles |
| 23 | Law & Government |
| 24 | Jobs & Education |

TABLE 1-continued

Top Level Categories

| | |
|---|---|
| 25 | News |
| 26 | Games |

TABLE 2

Top Categories from Meta-tag Key Word Examples

| Arts & Entertainment | Autos & Vehicles | Beauty & Personal Care | Books & Literature |
|---|---|---|---|
| art classes | auto trade in | skin treatment | buy books online |
| DIY | kelly blue book | hair treatment | used books |
| do it yourself | kelley blue book | skin | kindle |
| amazon | trade in value | hair | kindle fire |
| etsy | car donations | nails | barnes and noble |
| buy artwork | auto insurance quotes | manicure | quotes |
| sell your artwork | auto insurance rates | pedicure | new york times best sellers |
| free galleries | sedan | waxing | best seller list |
| art galleries | SUV | facials | most popular books |
| galleries | minivan | hairstyles | summer reading list |
| videos | jeep | beauty | summer reading |
| funny videos | mercedes | victoria secret | literary classics |
| youtube | audi | remington | best books of all time |
| imdb | infiniti | avon | most popular authors |
| movies | toyota | sephora | harry potter books |
| film festivals | auto parts | discount perfume | dr seuss books |
| concerts | auto repair | helene fischer | books on tape |
| michael's | child safety | perfume | children's books |
| joann fabrics | car seats | sally beauty supply | vampire books |
| crafts | donating a car | sally's beauty supply | twilight |
| craft projects | vehicle ratings | beauty salons | walden books |
| graphics | crash ratings | beauty tips | books for sale |
| publishing | vehicle safetly ratings | beauty samples | reading lists |
| design | automobile maintenance | best beauty products | cook books |
| graphic design | AAA | conair | download books |
| art schools | tires | professional beauty supplies | sell used books |
| museum of science | honda | wholesale beauty supplies | fiction |
| museum of art | car insurance | discount beauty products | non-fiction |
| museum of natural history | car inspection | beauty secrets | book groups |
| museum of fine arts | auto loans | beauty trends | reading groups |
| art auctions | low interest financing | short hair styles | book reviews |
| art appraisal | auto trader | hair style | magazine subscriptions |
| performing arts | advance auto parts | hair cuts | new yorker |
| picasso | auto recalls | laser hair removal | reader's digest |
| van gogh | autotrader.com | hair removal | literary magazines |
| da vinci | ford | hair extensions | best books of all time |
| monet | lincoln | hair loss | amazon books |
| henri matisse | dodge | hair color | coffee table books |
| salvador dali | nissan | long hair styles | borders books |
| rembrandt | BMW | hair accessories | books a million |
| andy warhol | cheverlet | wedding hair styles | audio books |
| georgia o'keeffe | audi | medium length hair styles | books online |
| michelangelo | hyrid | jennifer aniston hair | read books online free |
| artists | used cars | wedding hair | online books |
| famous artwork | car wash | prom hair | William Shakespeare |
| illustration | auto detailing | short hair | Shakespeare |
| drawing | auto parts | how to cut hair | jk rowling |
| painting | rent | hair straighteners | george orwell |
| fantasy art | car rental | curling hair | kurt vonnegut |
| modern | hyundai | curling irons | ernest hemingway |
| historical art | subaru | chest hair | william faulkner |
| landscapes | suzuki | makeover | james joyce |
| nude painting | ferrari | hair removal | jd salinger |
| photo-journalism | car loan interest rate | permanent hair removal | lord of the rings |
| pin-up | napa auto parts | hair transplant | the hobbit |
| pin up | used auto parts | hair colors | tale of two cities |
| portraiture | luxury vehicle | curly hair styles | catcher in the rye |
| portraits | o'reilly auto parts | easy hairstyles | mark twain |
| religious art | used auto parts | mens hair styles | jane austin |
| still life | cars for sale | best hair products | charles dickens |
| framing | selling a car | hair dyers | nathaniel hawthorne |
| movie times | buying a used car | blow dryers | fifty shades |
| plays | auto ratings | mac makeup | james patterson |
| theaters | trailer | mineral makeup | nicholas sparks |
| broadway | truck | makeup | nora roberts |
| posters | blue book | airbrush makeup | suzanne collins |
| movie reviews | car audio | makeup tips | stephen king |
| movie trailers | nascar | makeup reviews | |
| sculpture | safest vehicles | bare minerals makeup | michael connelly |
| sculpting | test drive | eye makeup | janet evanovich |
| animation | crossover | applying eye makeup | dan brown |
| fonts | race car | how to apply makeup | jrr tolkien |
| icons | | bare essentials makeup | john grisham |
| ticketmaster | | hair and makeup ideas | danielle steel |
| comedy | | organic makeup | debbie macomber |
| public art | | makeup tips | stephenie meyer |
| theatre | | makeup trends | jodi picoult |
| theater | | organic | dean koontz |
| | | all natural | cs lewis |
| | | bikini tanning | f scott fitzgerald |
| | | celebrity hair-style | author essays |
| | | nail art | free essays |
| | | shaving | kid's books |
| | | acne | teen reading |
| | | plastic surgery | |
| | | cosmetic surgery | |

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the content typically delivered to client web-users based upon IP zones is marketing content, this term should be taken broadly to include other web-user-relevant/specific content including alerts, public interest information, political information, and the like. In addition, while the illustrative embodiment refers to a network environment structured around TCP/IP as a communication protocol, it is expressly contemplated that other protocols can be substituted. For example, the teachings of this description can be adapted to operate using IP v6 using skill in the art. Likewise, other protocols, that are or may be adopted in the future can be adapted to generate "IP" zones (the term herein being taken broadly to include other protocols) where those protocols employ numeric, alphanumeric, alphabetical and/or otherwise symbolic) addresses that can be resolved with respect to the location (or other relevant characteristics) of the user. It is also expressly contemplated that any of the processes, procedures and/or method steps described herein can be performed using electronic hardware, software consisting of a non-transitory computer-readable medium of program instructions, or a combination of hardware and software. Likewise various processes and/or steps described herein can be combined or separated into different groups of sub-steps to carry out the functions of the various embodiments. Where used, a "means" can include various combinations of all or part of the structural and/or functional blocks described and depicted herein. Accordingly, this description is meant to be taken only by way of example, and not to otherwise limit the scope of this invention.

What is claimed is:

1. A method for linking qualified audiences with relevant media advertising, the method comprising the steps of:
    building a training set of Impression, Click Events via domains, site URLs, from a plurality of ad networks and sites;
    using the training set from a plurality of ad networks and sites where an IP address of a user, a domain, a time of day and a day of week, ad size and position, browser type are captured;
    mapping the IP address of the training set to a respective IP zone;
    enhancing each of the IP zones with a series of statistically indexed scores that include one or more of the plurality of categories, user types, Meta-tag key words, time or device type having a predetermined statistical relationship with both a real-time bid address and a respective IP Zone audience; and
    appending the training set, including Meta-tag key words, domain, site URLs, demographic profile of the user, category, time of day, day of week, ad position and size, bid value to each IP zone as a series of indexed scores.

2. A system for linking qualified audiences with relevant media advertising, comprising:
    a memory having program instructions stored thereon; and
    a processor configured to:
    build a training set of Impression, Click Events via domains, site URLs, from a plurality of ad networks and sites;
    use the training set from a plurality of ad networks and sites where an IP address of a user, a domain, a time of day and a day of week, ad size and position, browser type are captured;
    map the IP address of the training set to a respective IP zone;
    enhance each of the IP zones with a series of statistically indexed scores that include one or more of the plurality of categories, user types, Meta-tag key words, time or device type having a predetermined statistical relationship with both a real-time bid address and a respective IP Zone audience; and
    append the training set, including Meta-tag key words, domain, site URLs, demographic profile of the user, category, time of day, day of week, ad position and size, bid value to each IP zone as a series of indexed scores.

3. A non-transitory computer readable medium containing program instructions for causing a computer to perform the method of:
    building a training set of Impression, Click Events via domains, site URLs, from a plurality of ad networks and sites;
    using the training set from a plurality of ad networks and sites where an IP address of a user, a domain, a time of day and a day of week, ad size and position, browser type are captured;
    mapping the IP address of the training set to a respective IP zone;
    enhancing each of the IP zones with a series of statistically indexed scores that include one or more of the plurality of categories, user types, Meta-tag key words, time or device type having a predetermined statistical relationship with both a real-time bid address and a respective IP Zone audience; and
    appending the training set, including Meta-tag key words, domain, site URLs, demographic profile of the user, category, time of day, day of week, ad position and size, bid value to each IP zone as a series of indexed scores.

* * * * *